United States Patent
Ikeda et al.

(10) Patent No.: US 10,669,482 B2
(45) Date of Patent: Jun. 2, 2020

(54) LIQUID CRYSTAL COMPOSITION, LIQUID CRYSTAL CURED LAYER, AND METHOD FOR PRODUCING SAID LIQUID CRYSTAL CURED LAYER

(71) Applicant: ZEON CORPORATION, Chiyoda-ku, Tokyo (JP)

(72) Inventors: Akira Ikeda, Tokyo (JP); Shunpei Nakajima, Tokyo (JP); Masaya Miyamura, Tokyo (JP); Yuki Tamura, Tokyo (JP)

(73) Assignee: ZEON CORPORATION, Chiyoda-ku (JP)

( * ) Notice: Subject to any disclaimer, the term of this patent is extended or adjusted under 35 U.S.C. 154(b) by 0 days.

(21) Appl. No.: 16/081,937

(22) PCT Filed: Feb. 23, 2017

(86) PCT No.: PCT/JP2017/006870
§ 371 (c)(1),
(2) Date: Sep. 3, 2018

(87) PCT Pub. No.: WO2017/154598
PCT Pub. Date: Sep. 14, 2017

(65) Prior Publication Data
US 2019/0093014 A1 Mar. 28, 2019

(30) Foreign Application Priority Data
Mar. 8, 2016 (JP) .................................. 2016-044666

(51) Int. Cl.
| | | |
|---|---|---|
| G02F 1/1333 | (2006.01) | |
| C09K 19/38 | (2006.01) | |
| G02F 1/13363 | (2006.01) | |
| G02B 5/30 | (2006.01) | |
| C09K 19/34 | (2006.01) | |
| G02F 1/1337 | (2006.01) | |
| C09K 19/52 | (2006.01) | |
| C09K 19/04 | (2006.01) | |

(52) U.S. Cl.
CPC ...... *C09K 19/3885* (2013.01); *C09K 19/3497* (2013.01); *C09K 19/3809* (2013.01); *G02B 5/3016* (2013.01); *G02F 1/13363* (2013.01); *G02F 1/133365* (2013.01); *C09K 2019/0448* (2013.01); *C09K 2019/528* (2013.01); *G02F 1/133711* (2013.01); *G02F 1/133723* (2013.01); *G02F 2001/133637* (2013.01); *G02F 2001/133726* (2013.01)

(58) Field of Classification Search
CPC ............ C09K 19/3885; C09K 19/3497; C09K 19/3809; C09K 2019/528; C09K 2019/0448; G02F 1/1333; G02F 1/13363; G02F 1/133365; G02F 1/133723; G02F 1/133711; G02F 2001/133637; G02F 2001/133726; G02B 5/3016
USPC ..................................................... 252/299.01
See application file for complete search history.

(56) References Cited

U.S. PATENT DOCUMENTS

| | | | |
|---|---|---|---|
| 7,524,436 B2 | 4/2009 | Harding et al. | |
| 2015/0175564 A1* | 6/2015 | Sakamoto | C07D 417/12 526/257 |
| 2018/0072952 A1* | 3/2018 | Ikeda | C09K 19/38 |
| 2018/0275329 A1* | 9/2018 | Ikeda | B32B 7/02 |
| 2019/0071604 A1* | 3/2019 | Nakajima | C09K 19/38 |

FOREIGN PATENT DOCUMENTS

| | | |
|---|---|---|
| JP | 2007177241 A | 7/2007 |
| JP | 2009242564 A | 10/2009 |
| JP | 2013076851 A | 4/2013 |
| JP | 2013203940 A | 10/2013 |
| JP | 2016056106 A | 4/2016 |
| WO | 2009042544 A1 | 4/2009 |
| WO | 2016148047 A1 | 9/2016 |

OTHER PUBLICATIONS

Mar. 21, 2017, International Search Report issued in the International Patent Application No. PCT/JP2017/006870.
Sep. 11, 2018, International Preliminary Report on Patentability issued in the International Patent Application No. PCT/JP2017/006870.

* cited by examiner

*Primary Examiner* — Geraldina Visconti
(74) *Attorney, Agent, or Firm* — Kenja IP Law PC

(57) ABSTRACT

A liquid crystal composition including a polymerizable liquid crystal compound capable of expressing birefringence with reverse wavelength distribution and a surfactant containing a fluorine atom, a 1-octanol/water partition coefficient of the surfactant being less than 5.0.

7 Claims, 2 Drawing Sheets

LIQUID CRYSTAL COMPOSITION, LIQUID CRYSTAL CURED LAYER, AND METHOD FOR PRODUCING SAID LIQUID CRYSTAL CURED LAYER

FIELD

The present invention relates to a liquid crystal composition, a liquid crystal cured layer using the liquid crystal composition, and a method for producing the liquid crystal cured layer.

BACKGROUND

As a method for producing an optical film having a specific retardation, a method using a polymerizable liquid crystal compound has been known. In this method, a liquid crystal composition containing a polymerizable liquid crystal compound is applied onto an appropriate substrate such as a resin film to form a layer, and the polymerizable liquid crystal compound is oriented in the layer of the liquid crystal composition. The layer is then cured while the oriented state of the polymerizable liquid crystal compound is maintained. In a liquid crystal cured layer obtained by curing the layer of the liquid crystal composition, a retardation is expressed. Therefore, a desired optical film can be obtained by the aforementioned method (see Patent Literatures 1 to 4).

CITATION LIST

Patent Literature

Patent Literature 1: Japanese Patent Application Laid-Open No. 2013-203940 A
Patent Literature 2: Japanese Patent Application Laid-Open No. 2009-242564 A
Patent Literature 3: Japanese Patent Application Laid-Open No. 2013-076851 A
Patent Literature 4: Japanese Patent Application Laid-Open No. 2007-177241 A

SUMMARY

Technical Problem

In recent years, an optical film having a retardation with reverse wavelength distribution is required. As the material for such an optical film, there may be mentioned a polymerizable liquid crystal compound capable of expressing birefringence with reverse wavelength distribution. However, the polymerizable liquid crystal compounds capable expressing birefringence with reverse wavelength distribution have different molecular structures from those of existing general liquid crystal compound, and the study thereof has not yet sufficiently proceeded. Therefore, in conventional techniques like those in Patent Literatures 1 to 4, it is difficult to obtain a liquid crystal cured layer having both excellent surface state and orientation quality using a polymerizable liquid crystal compound capable of expressing birefringence with reverse wavelength distribution.

The present invention has been made in view of the problems. An object of the present invention is to provide a liquid crystal composition that contains a polymerizable liquid crystal compound capable of expressing birefringence with reverse wavelength distribution and enables production of a liquid crystal cured layer having both excellent surface state and orientation quality; a liquid crystal cured layer having both excellent surface state and orientation quality using a polymerizable liquid crystal compound capable of expressing birefringence with reverse wavelength distribution; and a method for producing a liquid crystal cured layer having both excellent surface state and orientation quality using a polymerizable liquid crystal compound capable of expressing birefringence with reverse wavelength distribution.

Solution to Problem

The present inventors have intensively studied to solve the aforementioned problems. As a result, the inventors have found that, from a liquid crystal composition containing a polymerizable liquid crystal compound capable of expressing birefringence with reverse wavelength distribution and a surfactant containing a fluorine atom and having a specific 1-octanol/water partition coefficient in combination, a liquid crystal cured layer having both excellent surface state and orientation quality can be produced. Thus, the present invention has been completed.

Specifically, the present invention is as follows.

(1) A liquid crystal composition comprising a polymerizable liquid crystal compound capable of expressing birefringence with reverse wavelength distribution and a surfactant containing a fluorine atom, a 1-octanol/water partition coefficient of the surfactant being less than 5.0.

(2) The liquid crystal composition according to (1), wherein a ratio of the fluorine atom in a molecule of the surfactant is 30% by weight or less.

(3) The liquid crystal composition according to (1) or (2), wherein the polymerizable liquid crystal compound contains a main chain mesogen and a side chain mesogen bonded to the main chain mesogen in a molecule of the polymerizable liquid crystal compound.

(4) The liquid crystal composition according to any one of (1) to (3), wherein the polymerizable liquid crystal compound is represented by the following formula (I):

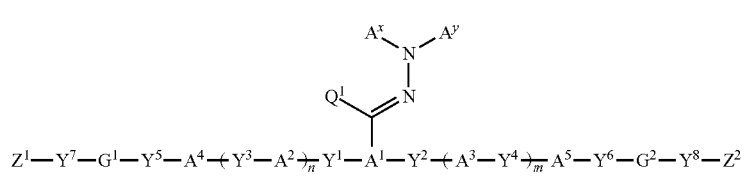

(in the formula (I), $Y^1$ to $Y^8$ each independently represent a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ represents a hydrogen atom or an alkyl group of 1 to 6 carbon atoms;

G[1] and G[2] each independently represent a divalent aliphatic group of 1 to 20 carbon atoms optionally having a substituent, wherein the aliphatic group may contain one or more per aliphatic group of —O—, —S—, —O—C(=O)—, —C(=O)—O—, —O—C(=O)—O—, —NR[2]—C(=O)—, —C(=O)—NR[2]—, —NR[2]—, or —C(=O)— inserted therein, with a proviso that cases where two or more —O— or —S— groups are adjacent to each other are excluded, and wherein R[2] represents a hydrogen atom or an alkyl group of 1 to 6 carbon atoms;

$Z^1$ and $Z^2$ each independently represent an alkenyl group of 2 to 10 carbon atoms optionally substituted with a halogen atom;

$A^x$ represents an organic group of 2 to 30 carbon atoms having at least one aromatic ring selected from the group consisting of an aromatic hydrocarbon ring and an aromatic heterocyclic ring;

$A^y$ represents a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R[3], —SO$_2$—R[4], —C(=S)NH—R[9], or an organic group of 2 to 30 carbon atoms containing at least one aromatic ring selected from the group consisting of an aromatic hydrocarbon ring and an aromatic heterocyclic ring, wherein R[3] represents an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; R[4] represents an alkyl group of 1 to 20 carbon atoms, an alkenyl group of 2 to 20 carbon atoms, a phenyl group, or a 4-methylphenyl group; R[9] represents an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring contained in $A^x$ and $A^y$ may have a substituent; and $A^x$ and $A^y$ may form a ring together;

$A^1$ represents a trivalent aromatic group optionally having a substituent;

$A^2$ and $A^3$ each independently represent a divalent alicyclic hydrocarbon group of 3 to 30 carbon atoms optionally having a substituent;

$A^4$ and $A^5$ each independently represent a divalent aromatic group of 6 to 30 carbon atoms optionally having a substituent;

$Q^1$ represents a hydrogen atom or an alkyl group of 1 to 6 carbon atoms optionally having a substituent; and m and n each independently represent 0 or 1).

(5) A liquid crystal cured layer comprising a cured product of the liquid crystal composition according to any one of (1) to (4).

(6) The liquid crystal cured layer according to (5), wherein
  the liquid crystal cured layer has a long-length shape;
  the liquid crystal cured layer has a slow axis at an angle of 40° to 50° relative to a lengthwise direction of the liquid crystal cured layer.

(7) A method for producing a liquid crystal cured layer, comprising the steps of:
  applying the liquid crystal composition according to any one of (1) to (4) onto a supporting surface to form a layer of the liquid crystal composition;
  giving orientation to the polymerizable liquid crystal compound contained in the layer of the liquid crystal composition; and
  curing the layer of the liquid crystal composition.

Advantageous Effects of Invention

The present invention can provide a liquid crystal composition that contains a polymerizable liquid crystal compound capable of expressing birefringence with reverse wavelength distribution and enables production of a liquid crystal cured layer having both excellent surface state and orientation quality; a liquid crystal cured layer having both excellent surface state and orientation quality using a polymerizable liquid crystal compound capable of expressing birefringence with reverse wavelength distribution; and a method for producing a liquid crystal cured layer having both excellent surface state and orientation quality using a polymerizable liquid crystal compound capable of expressing birefringence with reverse wavelength distribution.

DESCRIPTION OF EMBODIMENTS

Figure 1:
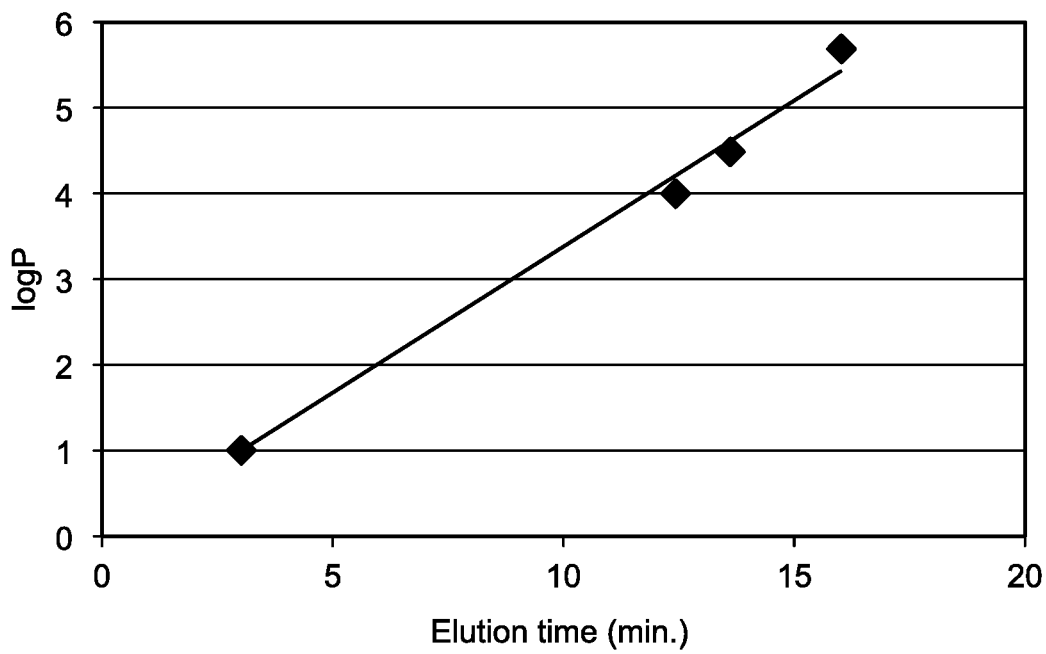
FIG. 1 is a graph showing a calibration line used in measurement of log P in Examples and Comparative Examples of the present invention.

Hereinafter, the present invention will be described in detail with reference to examples and embodiments. However, the present invention is not limited to the following examples and embodiments, and may be freely modified for implementation without departing from the scope of claims of the present invention and the scope of their equivalents.

In the following description, a direction of an element being "parallel" and "perpendicular" may allow an error within the range of not impairing the advantageous effects of the present invention, for example, within a range of ±5°, preferably within a range of ±3°, and more preferably within a range of ±1°, unless otherwise specified.

In the following description, a retardation of a certain layer represents an in-plane retardation Re, unless otherwise specified. The in-plane retardation Re is a value represented by Re=(nx−ny)×d, unless otherwise specified. Herein, nx represents a refractive index in a direction which gives, among directions perpendicular to the thickness direction of the layer (in-plane directions), the maximum refractive index. ny represents a refractive index in a direction, among the above-mentioned in-plane directions of the layer, orthogonal to the direction giving nx. d represents the thickness of the layer. The measurement wavelength of the retardation is 550 nm unless otherwise specified.

In the following description, the direction of a slow axis of a certain layer refers to a direction of the slow axis of the in-plane directions, unless otherwise specified.

In the following description, a resin having a positive intrinsic birefringence value means a resin of which a refractive index in a stretched direction is larger than a refractive index in a direction orthogonal to the stretched direction. A resin having a negative intrinsic birefringence value means a resin of which the refractive index in the stretched direction is smaller than the refractive index in the direction orthogonal to the stretched direction. The intrinsic birefringence value may be calculated from dielectric constant distribution.

In the following description, "polarizing plate" and "wave plate" are used as terms including flexible films and sheets such as a resin film, unless otherwise specified.

[1. Summary of Liquid Crystal Composition]

The liquid crystal composition of the present invention contains a polymerizable liquid crystal compound capable of expressing birefringence with reverse wavelength distribution and a surfactant containing a fluorine atom. In the following description, the polymerizable liquid crystal compound capable of expressing birefringence with reverse wavelength distribution may be referred to as a "polymerizable liquid crystal compound with reverse wavelength distribution" as appropriate. In the following description, the surfactant containing a fluorine atom may be referred to as a "fluorine-containing surfactant" as appropriate.

The fluorine-containing surfactant has a 1-octanol/water partition coefficient of less than a specific value. In the following description, the 1-octanol/water partition coefficient may be referred to as "log P" as appropriate. When the liquid crystal composition of the present invention containing the fluorine-containing surfactant and the polymerizable liquid crystal compound with reverse wavelength distribution in combination is cured while keeping the state of the polymerizable liquid crystal compound with reverse wavelength distribution being oriented, a liquid crystal cured layer having excellent surface state and orientation quality can be produced.

The liquid crystal composition of the present invention is not limited to a certain form such as a powder form or a liquid form at normal temperature. However, the liquid crystal composition is usually a fluid composition in a temperature range in which an orientation treatment is performed (usually 50° C. to 150° C.)

[2. Polymerizable Liquid Crystal Compound with Reverse Wavelength Distribution]

The polymerizable liquid crystal compound with reverse wavelength distribution has liquid crystal properties. Therefore, when the polymerizable liquid crystal compound with reverse wavelength distribution is oriented, a liquid crystal phase may be exhibited. The polymerizable liquid crystal compound with reverse wavelength distribution has polymerizability. Therefore, when the polymerizable liquid crystal compound with reverse wavelength distribution is polymerized in a state wherein the liquid crystal phase is exhibited as described above, the compound may form a polymer with orientation of molecules in the liquid crystal phase being maintained.

Further, the polymerizable liquid crystal compound with reverse wavelength distribution is a compound capable of expressing birefringence with reverse wavelength distribution. Herein, the compound capable of expressing birefringence with reverse wavelength distribution refers to a compound the polymer of which obtained in accordance with the aforementioned manner expresses birefringence with reverse wavelength distribution.

The birefringence with reverse wavelength distribution refers to a birefringence in which a birefringence $\Delta n(450)$ at a wavelength of 450 nm and a birefringence $\Delta n(650)$ at a wavelength of 650 nm satisfy the following expression (1). The polymerizable liquid crystal compound with reverse wavelength distribution capable of expressing such birefringence with reverse wavelength distribution may usually express larger birefringence as the measurement wavelength is longer. Therefore, the birefringence of the polymer obtained by polymerizing the polymerizable liquid crystal compound with reverse wavelength distribution in accordance with the aforementioned manner usually satisfies the following expression (2). In the following expression (2), $\Delta n(550)$ represents a birefringence at a measurement wavelength of 550 nm.

$$\Delta n(450) < \Delta n(650) \tag{1}$$

$$\Delta n(450) < \Delta n(550) < \Delta n(650) \tag{2}$$

As the polymerizable liquid crystal compound with reverse wavelength distribution, for example, a compound containing a main chain mesogen and a side chain mesogen bonded to the main chain mesogen in the molecule of the polymerizable liquid crystal compound with reverse wavelength distribution may be used. In a state wherein the polymerizable liquid crystal compound with reverse wavelength distribution containing the main chain mesogen and the side chain mesogen is oriented, the side chain mesogen may be oriented in a direction different from that of the main chain mesogen. Therefore, the main chain mesogen and the side chain mesogen may be oriented in different directions in the polymer obtained by polymerizing the polymerizable liquid crystal compound with reverse wavelength distribution with such orientation being maintained. In this case, the birefringence is expressed as a difference between the refractive index corresponding to the main chain mesogen and the refractive index corresponding to the side chain mesogen. Therefore, the polymerizable liquid crystal compound with reverse wavelength distribution and a polymer thereof can express birefringence with reverse wavelength distribution.

For example, the polymerizable liquid crystal compound with reverse wavelength distribution, such as the compound having the main chain mesogen and the side chain mesogen, usually has a specific steric structure that is different from the steric structure of a general polymerizable liquid crystal compound with forward wavelength distribution. Herein, the "polymerizable liquid crystal compound with forward wavelength distribution" refers to a polymerizable liquid crystal compound capable of expressing birefringence with forward wavelength distribution. The birefringence with forward wavelength distribution represents a birefringence of which the absolute value is smaller as the measurement wavelength is longer. It is deduced that such a specific steric structure of the polymerizable liquid crystal compound with reverse wavelength distribution can be one of factors causing an effect of enabling production of a liquid crystal cured layer having excellent surface state and orientation quality when the polymerizable liquid crystal compound with reverse wavelength distribution is combined with the fluorine-containing surfactant. However, the technical scope of the present invention is not restricted by the aforementioned deduction.

The molecular weight of the polymerizable liquid crystal compound with reverse wavelength distribution is preferably 300 or more, more preferably 700 or more, and particularly preferably 1000 or more, and is preferably 2000 or less, more preferably 1700 or less, and particularly preferably 1500 or less. When the polymerizable liquid crystal compound with reverse wavelength distribution has the aforementioned molecular weight, this means that the polymerizable liquid crystal compound with reverse wavelength distribution is a monomer. By using the polymerizable liquid crystal compound with reverse wavelength distribution as being not a polymer but a monomer, the liquid crystal composition can have particularly favorable application properties.

As the polymerizable liquid crystal compound with reverse wavelength distribution, one type thereof may be solely used, and two or more types thereof may also be used in combination at any ratio.

Examples of the polymerizable liquid crystal compound with reverse wavelength distribution may include a compound represented by the following formula (Ia). In the following description, the compound represented by the formula (Ia) is sometimes appropriately referred to as a "compound (Ia)".

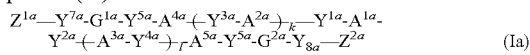
(Ia)

In the above-described formula (Ia), $A^{1a}$ represents an aromatic hydrocarbon ring group having as a substituent an organic group of 1 to 67 carbon atoms having at least one aromatic ring selected from the group consisting of an aromatic hydrocarbon ring and an aromatic heterocyclic ring; or an aromatic heterocyclic ring group having as a substituent an organic group of 1 to 67 carbon atoms having at least one aromatic ring selected from the group consisting of an aromatic hydrocarbon ring and an aromatic heterocyclic ring.

Specific examples of $A^{1a}$ may include: a phenylene group substituted with a group represented by a formula: —$R^fC$(=N—N$R^gR^h$) or formula: —$R^fC$(=N—N=$R^{f1}R^h$); a benzothiazole-4,7-diyl group substituted with a 1-benzofuran-2-yl group; a benzothiazole-4,7-diyl group substituted with a 5-(2-butyl)-1-benzofuran-2-yl group; a benzothiazole-4,7-diyl group substituted with a 4,6-dimethyl-1-benzofuran-2-yl group; a benzothiazole-4,7-diyl group substituted with a 6-methyl-1-benzofuran-2-yl group; a benzothiazole-4,7-diyl group substituted with a 4,6,7-trimethyl-1-benzofuran-2-yl group; a benzothiazole-4,7-diyl group substituted with a 4,5,6-trimethyl-1-benzofuran-2-yl group; a benzothiazole-4,7-diyl group substituted with a 5-methyl-1-benzofuran-2-yl group; a benzothiazole-4,7-diyl group substituted with a 5-propyl-1-benzofuran-2-yl group; a benzothiazole-4,7-diyl group substituted with a 7-propyl-1-benzofuran-2-yl group; a benzothiazole-4,7-diyl group substituted with a 5-fluoro-1-benzofuran-2-yl group; a benzothiazole-4,7-diyl group substituted with a phenyl group; a benzothiazole-4,7-diyl group substituted with a 4-fluorophenyl group; a benzothiazole-4,7-diyl group substituted with a 4-nitrophenyl group; a benzothiazole-4,7-diyl group substituted with a 4-trifluoromethylphenyl group; a benzothiazole-4,7-diyl group substituted with a 4-cyanophenyl group; a benzothiazole-4,7-diyl group substituted with a 4-methanesulfonylphenyl group; a benzothiazole-4,7-diyl group substituted with a thiophen-2-yl group; a benzothiazole-4,7-diyl group substituted with a thiophen-3-yl group; a benzothiazole-4,7-diyl group substituted with a 5-methylthiophen-2-yl group; a benzothiazole-4,7-diyl group substituted with a 5-chlorothiophen-2-yl group; a benzothiazole-4,7-diyl group substituted with a thieno[3,2-b]thiophen-2-yl group; a benzothiazole-4,7-diyl group substituted with a 2-benzothiazolyl group; a benzothiazole-4,7-diyl group substituted with a 4-biphenyl group; a benzothiazole-4,7-diyl group substituted with a 4-propylbiphenyl group; a benzothiazole-4,7-diyl group substituted with a 4-thiazolyl group; a benzothiazole-4,7-diyl group substituted with a 1-phenylethylene-2-yl group; a benzothiazole-4,7-diyl group substituted with a 4-pyridyl group; a benzothiazole-4,7-diyl group substituted with a 2-furyl group; a benzothiazole-4,7-diyl group substituted with a naphtho[1,2-b]furan-2-yl group; a 1H-isoindole-1,3(2H)-dione-4,7-diyl group substituted with a 5-methoxy-2-benzothiazolyl group; a 1H-isoindole-1,3(2H)-dione-4,7-diyl group substituted with a phenyl group; a 1H-isoindole-1,3(2H)-dione-4,7-diyl group substituted with a 4-nitrophenyl group; and a 1H-isoindole-1,3(2H)-dione-4,7-diyl group substituted with a 2-thiazolyl group. Herein, $R^f$ and $R^{f1}$ each independently represent the same meaning as $Q^1$ described later. $R^g$ represents the same meaning as $A^y$ described later, and $R^h$ represents the same meaning as $A^x$ described later.

In the above-described formula (Ia), $Y^{1a}$ to $Y^{8a}$ each independently represent a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—. Herein, R$^1$ represents a hydrogen atom or an alkyl group of 1 to 6 carbon atoms.

In the above-described formula (Ia), $G^{1a}$ and $G^{2a}$ each independently represent a divalent aliphatic group of 1 to 20 carbon atoms optionally having a substituent. The aliphatic group may contain one or more per aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein. However, cases where two or more —O— or —S— groups are inserted adjacently to each other are excluded. Herein, R$^2$ represents a hydrogen atom or an alkyl group of 1 to 6 carbon atoms.

In the above-described formula (Ia), $Z^{1a}$ and $Z^{2a}$ each independently represent an alkenyl group of 2 to 10 carbon atoms optionally substituted with a halogen atom.

In the above-described formula (Ia), $A^{2a}$ and $A^{3a}$ each independently represent a divalent alicyclic hydrocarbon group of 3 to 30 carbon atoms optionally having a substituent.

In the above-described formula (Ia), $A^{4a}$ and $A^{5a}$ each independently represent a divalent aromatic group of 6 to 30 carbon atoms optionally having a substituent.

In the above-described formula (Ia), k and l each independently represent 0 or 1.

Suitable specific example of the polymerizable liquid crystal compound with reverse wavelength distribution may include a compound represented by the following formula (I). In the following description, the compound represented by the formula (I) is sometimes appropriately referred to as a "compound (I)".

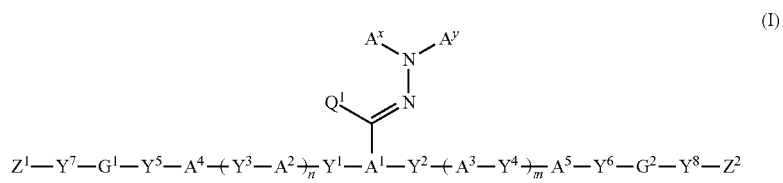
(I)

The compound (I) usually includes, as represented by the following formula, two mesogen skeletons: a main chain mesogen 1a consisting of a group —$Y^5$-$A^4$-($Y^3$-$A^2$)$_n$-$Y^1$-$A^1$-$Y^2$-($A^3$-$Y^4$)$_m$-$A^5$-$Y^6$—, and a side chain mesogen 1b consisting of a group >$A^1$-C($Q^1$)=N—N($A^x$)$A^y$. These main chain mesogen 1a and side chain mesogen 1b intersect each other. Although the main chain mesogen 1a and the side chain mesogen 1b may be integratedly regarded as one mesogen, these are described as two separate mesogens in the present invention.

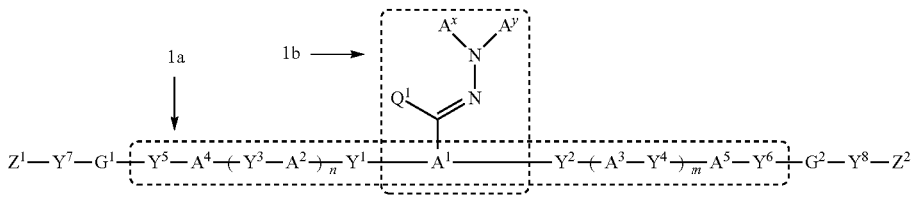

The refractive index of the main chain mesogen 1a in the long-axis direction is denoted as n1 and the refractive index of the side chain mesogen 1b in the long-axis direction is denoted as n2. In this case, the absolute value and wavelength distribution of the refractive index n1 usually depend on the molecular structure of the main chain mesogen 1a. The absolute value and wavelength distribution of the refractive index n2 usually depend on the molecular structure of the side chain mesogen 1b. In the liquid crystal phase, the polymerizable liquid crystal compound with reverse wavelength distribution is usually subjected to rotating movement around the long-axis direction of the main chain mesogen 1a as the rotation axis. The refractive indices n1 and n2 referred to herein represent the refractive indices of a body of rotation.

Due to the molecular structures of the main chain mesogen 1a and the side chain mesogen 1b, the absolute value of the refractive index n1 is larger than the absolute value of the refractive index n2. Further, the refractive indices n1 and n2 usually exhibit forward wavelength distribution. A refractive index with forward wavelength distribution herein means a refractive index of which the absolute value is smaller as the measurement wavelength is longer. The refractive index n1 of the main chain mesogen 1a exhibits a small degree of forward wavelength distribution. Therefore, the refractive index n1 measured at a long wavelength is smaller than the refractive index n1 measured at a short wavelength, but the difference between the refractive indices is small. In contrast, the refractive index n2 of the side chain mesogen 1b exhibits a large degree of forward wavelength distribution. Therefore, the refractive index n2 measured at a long wavelength is smaller than the refractive index n2 measured at a short wavelength, and the difference between the refractive indices is large. Accordingly, the difference Δn between the refractive index n1 and the refractive index n2 is small with the short measurement wavelength, whereas the difference Δn between the refractive index n1 and the refractive index n2 is large with the long measurement wavelength. In this manner, the ratio of birefringence with reverse wavelength distribution may be expressed due to the main chain mesogen 1a and the side chain mesogen 1b.

In the above-described formula (I), $Y^1$ to $Y^8$ each independently represent a chemical single bond, —O—, —S—, —O—C(=O)—, —C(=O)—O—, —O—C(=O)—O—, —$NR^1$—C(=O)—, —C(=O)—$NR^1$—, —O—C(=O)—$NR^1$—, —$NR^1$—C(=O)—O—, —$NR^1$—C(=O)—$NR^1$—, —O—$NR^1$—, or —$NR^1$—O—.

Herein, $R^1$ represents a hydrogen atom or an alkyl group of 1 to 6 carbon atoms.

Examples of the alkyl group of 1 to 6 carbon atoms of $R^1$ may include a methyl group, an ethyl group, a n-propyl group, an isopropyl group, a n-butyl group, a sec-butyl group, a t-butyl group, a n-pentyl group, and a n-hexyl group.

$R^1$ is preferably a hydrogen atom or an alkyl group of 1 to 4 carbon atoms.

In the compound (I), $Y^1$ to $Y^8$ each independently are preferably a chemical single bond, —O—, —O—C(=O)—, —C(=O)—O—, or —O—C(=O)—O—.

In the above-described formula (I), $G^1$ and $G^2$ each independently represent a divalent aliphatic group of 1 to 20 carbon atoms optionally having a substituent.

Examples of the divalent aliphatic group of 1 to 20 carbon atoms may include divalent aliphatic groups having a linear structure such as an alkylene group of 1 to 20 carbon atoms and an alkenylene group of 2 to 20 carbon atoms; and divalent aliphatic group such as a cycloalkanediyl group of 3 to 20 carbon atoms, a cycloalkenediyl group of 4 to 20 carbon atoms, and a divalent alicyclic fused ring group of 10 to 30 carbon atoms.

Examples of the substituent of the divalent aliphatic group of $G^{1a}$ and $G^{2a}$ may include a halogen atom such as a fluorine atom, a chlorine atom, a bromine atom, and an iodine atom; and an alkoxy group having 1 to 6 carbon atoms such as a methoxy group, an ethoxy group, a n-propoxy group, an isopropoxy group, a n-butoxy group, a sec-butoxy group, a t-butoxy group, a n-pentyloxy group, and a n-hexyloxy group. Among these, a fluorine atom, a methoxy group, and an ethoxy group are preferable.

The aliphatic group may contain one or more per aliphatic group of —O—, —S—, —O—C(=O)—, —C(=O)—O—, —O—C(=O)—O—, —$NR^2$—C(=O)—, —C(=O)—$NR^2$—, —$NR^2$—, or —C(=O)— inserted therein. However, cases where two or more —O— or —S— groups are inserted adjacently to each other are excluded. Herein, $R^2$ represents a hydrogen atom or an alkyl group of 1 to 6 carbon atoms, and the hydrogen atom and a methyl group are preferable.

The group inserted in the aliphatic group is preferably —O—, —O—C(=O)—, —C(=O)—O—, or —C(=O).

Specific examples of the aliphatic group containing these groups inserted therein may include —$CH_2$—$CH_2$—O—$CH_2$—$CH_2$—, —$CH_2$—$CH_2$—S—$CH_2$—$CH_2$—, —$CH_2$—$CH_2$—O—C(=O)—$CH_2$—$CH_2$—, —$CH_2$—$CH_2$—C(=O)—O—$CH_2$—$CH_2$—, —$CH_2$—$CH_2$—C(=O)—O—$CH_2$—, —$CH_2$—O—C(=O)—O—$CH_2$—$CH_2$—, —$CH_2$—$CH_2$—$NR^2$—C(=O)—$CH_2$—$CH_2$—, —$CH_2$—$CH_2$—C(=O)—$NR^2$—$CH_2$—, —$CH_2$—$NR^2$—$CH_2$—$CH_2$—, and —$CH_2$—C(=O)—$CH_2$—.

Among these, from the viewpoint of more favorably expressing a desired effect of the present invention, $G^1$ and $G^2$ each independently are preferably a divalent aliphatic group having a linear structure such as an alkylene group of 1 to 20 carbon atoms and an alkenylene group of 2 to 20 carbon atoms, more preferably an alkylene group of 1 to 12 carbon atoms such as a methylene group, an ethylene group, a trimethylene group, a propylene group, a tetramethylene group, a pentamethylene group, a hexamethylene group, an octamethylene group, or a decamethylene group [—$(CH_2)_{10}$—], and particularly preferably a tetramethylene group [—$(CH_2)_4$—], a hexamethylene group [—$(CH_2)_6$—], an octamethylene group [—$(CH_2)_8$—], or a decamethylene group [—$(CH_2)_{10}$—].

In the above-described formula (I), $Z^1$ and $Z^2$ each independently represent an alkenyl group of 2 to 10 carbon atoms optionally substituted with a halogen atom.

The number of carbon atoms of the alkenyl group is preferably 2 to 6. Examples of the halogen atom that is the substituent in the alkenyl group of $Z^1$ and $Z^2$ may include a fluorine atom, a chlorine atom, and a bromine atom, and a chlorine atom is preferable.

Specific examples of the alkenyl group of 2 to 10 carbon atoms of $Z^1$ and $Z^2$ may include $CH_2$=CH—, $CH_2$=C($CH_3$)—, $CH_2$=CH—$CH_2$—, $CH_3$—CH=CH—, $CH_2$=CH—$CH_2$—$CH_2$—, $CH_2$=C($CH_3$)—$CH_2$—$CH_2$—, $(CH_3)_2$C=CH—$CH_2$—, $(CH_3)_2$C=CH—$CH_2$—$CH_2$—, $CH_2$=C(Cl)—, $CH_2$=C($CH_3$)—$CH_2$—, and $CH_3$—CH=CH—$CH_2$—.

Among these, from the viewpoint of more favorably expressing a desired effect of the present invention, $Z^1$ and $Z^2$ each independently are preferably $CH_2$=CH—, $CH_2$=C($CH_3$)—, $CH_2$=C(Cl)—, $CH_2$=CH—$CH_2$—, $CH_2$=C($CH_3$)—$CH_2$—, or $CH_2$=C($CH_3$)—$CH_2$—$CH_2$—, more preferably $CH_2$=CH—, $CH_2$=C($CH_3$)—, or —$CH_2$=C(Cl)—, and particularly preferably $CH_2$=CH—.

In the above-described formula (I), $A^x$ represents an organic group of 2 to 30 carbon atoms having at least one aromatic ring selected from the group consisting of an aromatic hydrocarbon ring and an aromatic heterocyclic ring. The "aromatic ring" means a cyclic structure having aromaticity in the broad sense based on Huckel rule, that is, a cyclic conjugated structure having (4n+2)π electrons, and a cyclic structure that exhibits aromaticity by involving a lone pair of heteroatom such as sulfur, oxygen, and nitrogen in a π electron system, typified by thiophene, furan, and benzothiazole.

The organic group of 2 to 30 carbon atoms having at least one aromatic ring selected from the group consisting of an aromatic hydrocarbon ring and an aromatic heterocyclic ring of $A^x$ may be a group having a plurality of aromatic rings, or a group having both the aromatic hydrocarbon ring and the aromatic heterocyclic ring.

Examples of the aromatic hydrocarbon ring may include a benzene ring, a naphthalene ring, and an anthracene ring. Examples of the aromatic heterocyclic ring may include monocyclic aromatic heterocyclic rings such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and fused aromatic heterocyclic ring such as a benzothiazole ring, a benzoxazole ring, a quinoline ring, a phthalazine ring, a benzimidazole ring, a benzopyrazole ring, a benzofuran ring, a benzothiophene ring, a thiazolopyridine ring, an oxazolopyridine ring, a thiazolopyrazine ring, an oxazolopyrazine ring, a thiazolopyridazine ring, an oxazolopyridazine ring, a thiazolopyrimidine ring, and an oxazolopyrimidine ring.

The aromatic ring contained in $A^x$ may have a substituent. Examples of such a substituent may include a halogen atom such as a fluorine atom and a chlorine atom; a cyano group; an alkyl group of 1 to 6 carbon atoms such as a methyl group, an ethyl group, and a propyl group; an alkenyl group of 2 to 6 carbon atoms such as a vinyl group and an allyl group; a halogenated alkyl group of 1 to 6 carbon atoms such as a trifluoromethyl group; a substituted amino group such as a dimethylamino group; an alkoxy group of 1 to 6 carbon atoms such as a methoxy group, an ethoxy group, and an isopropoxy group; a nitro group; a phenyl group; an aryl group such as a phenyl group and a naphthyl group; —C(=O)—$R^5$; —C(=O)—$OR^5$; and —$SO_2R^6$. Herein, $R^5$ represents an alkyl group of 1 to 20 carbon atoms, an alkenyl group of 2 to 20 carbon atoms, or a cycloalkyl group of 3 to 12 carbon atoms, and $R^6$ represents the same groups as those for $R^4$ described below, and is an alkyl group of 1 to 20 carbon atoms, an alkenyl group of 2 to 20 carbon atoms, a phenyl group, or a 4-methylphenyl group.

The aromatic ring contained in $A^x$ may have a plurality of the same or different substituents, and adjacent two substituents may be bound to each other to together form a ring. The formed ring may be a monocycle, a fused polycycle, an unsaturated ring, or a saturated ring.

The "carbon atoms" of the organic group of 2 to 30 carbon atoms of $A^x$ means the total number of carbon atoms of the entire organic group excluding the carbon atoms of the substituent(s) (the meaning of which is the same in $A^y$ to be described later).

Examples of the organic group of 2 to 30 carbon atoms having at least one aromatic ring selected from the group consisting of an aromatic hydrocarbon ring and an aromatic heterocyclic ring of $A^x$ may include an aromatic hydrocarbon ring group; an aromatic heterocyclic group; a group containing a combination of an aromatic hydrocarbon ring and a heterocyclic ring; an alkyl group of 3 to 30 carbon atoms having at least one aromatic ring selected from the group consisting of an aromatic hydrocarbon ring and a heterocyclic ring; an alkenyl group of 4 to 30 carbon atoms having at least one aromatic ring selected from the group consisting of an aromatic hydrocarbon ring and an aromatic heterocyclic ring; and an alkynyl group having 4 to 30 carbon atoms having at least one aromatic ring selected from the group consisting of an aromatic hydrocarbon ring and an aromatic heterocyclic ring.

Preferable specific examples of $A^x$ are shown below, but $A^x$ is not limited to the followings examples. In the following formulae, "—" represents a bond extending from an arbitrary position on the ring (the same applies to the following descriptions).

(1) Aromatic Hydrocarbon Group

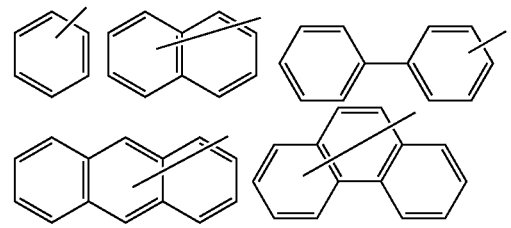

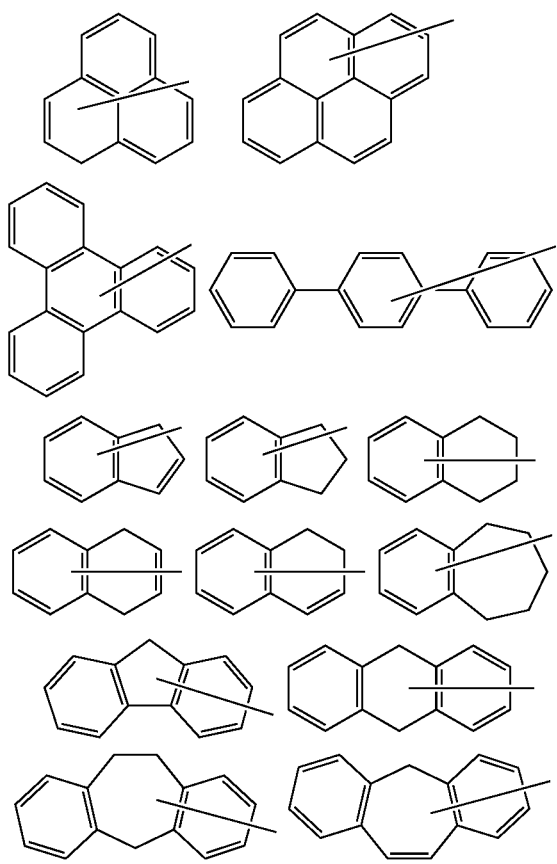

(2) Aromatic Heterocyclic Ring Group

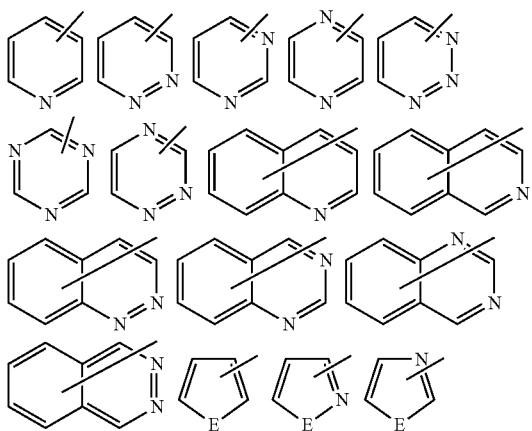

In the above-mentioned formulae, E represents $NR^{6a}$, an oxygen atom, or a sulfur atom. Herein, $R^{6a}$ represents a hydrogen atom; or an alkyl group of 1 to 6 carbon atoms such as a methyl group, an ethyl group, and a propyl group.

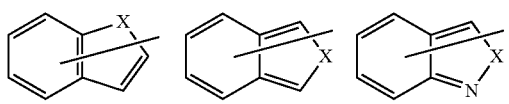

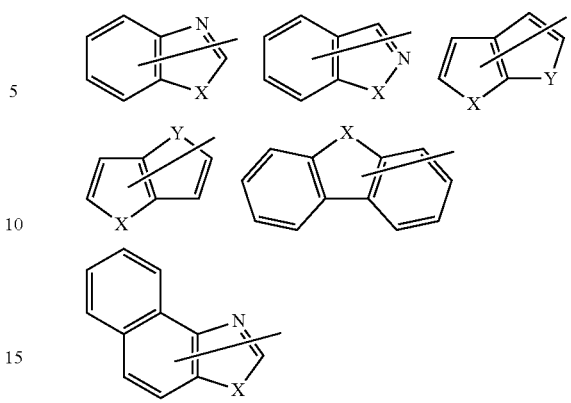

In the above-mentioned formulae, X and Y each independently represent $NR^7$, an oxygen atom, a sulfur atom, —SO—, or —SO$_2$— (with a proviso that cases where an oxygen atom, a sulfur atom, —SO—, and —SO$_2$— are each adjacent to each other are excluded.). $R^7$ represents the same substituents as those for $R^{6a}$ described above, and is a hydrogen atom; or an alkyl group of 1 to 6 carbon atoms such as a methyl group, an ethyl group, and a propyl group.

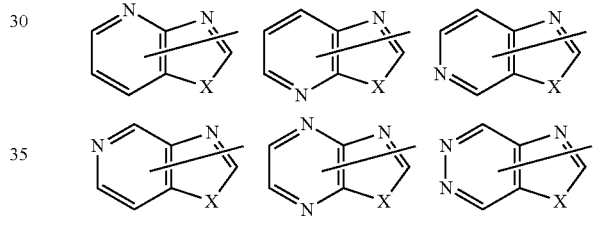

(In the above-mentioned formulae, X represents the same meanings as the previous descriptions.)

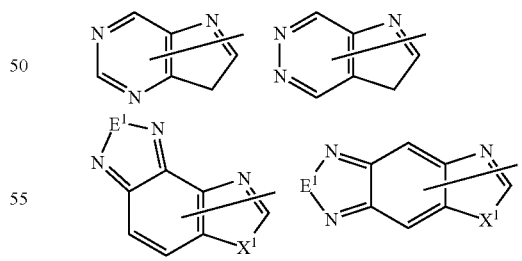

[In each of the formulae, $X^1$ represents —CH$_2$—, —NR$^c$—, an oxygen atom, a sulfur atom, —SO—, or —SO$_2$—, and $E^1$ represents —NR$^c$—, an oxygen atom, or a sulfur atom. Herein, $R^c$ represents a hydrogen atom; or an alkyl group of 1 to 6 carbon atoms such as a methyl group, an ethyl group, and a propyl group. (However, in each of the formulae, an oxygen atom, a sulfur atom, —SO—, and —SO$_2$— are each not adjacent to each other.)]

(3) Group Containing Combination of Aromatic Hydrocarbon Ring and Heterocyclic Ring

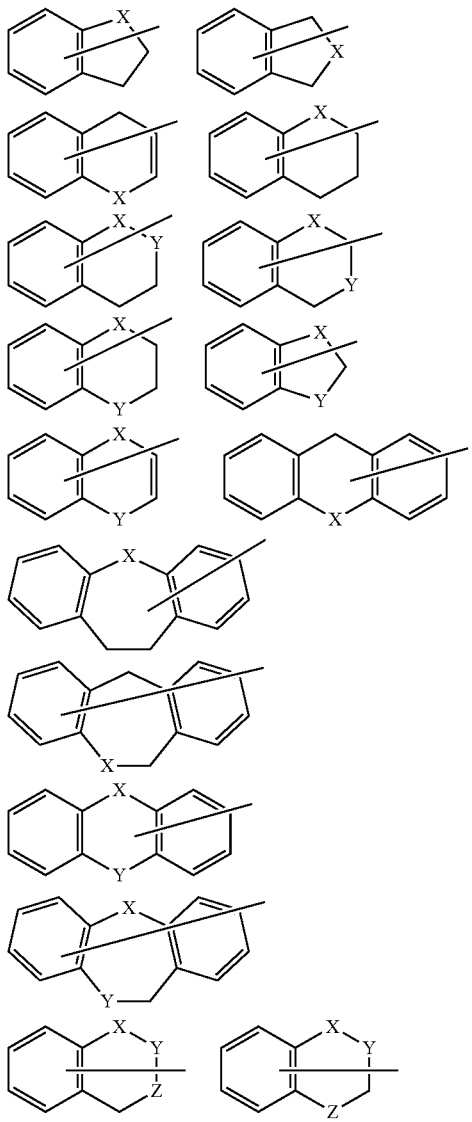

(In the above-mentioned formulae, X and Y each independently represent the same meanings as the previous descriptions. In the above-mentioned formulae, Z represents $NR^7$, an oxygen atom, a sulfur atom, —SO—, or —SO$_2$— (with a proviso that cases where an oxygen atom, a sulfur atom, —SO—, and —SO$_2$— are each adjacent to each other are excluded.).)

(4) Alkyl Group Containing at Least One Aromatic Ring Selected from the Group Consisting of Aromatic Hydrocarbon Ring and Aromatic Heterocyclic Ring

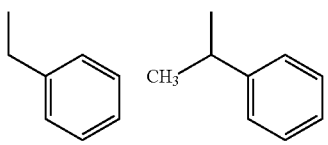

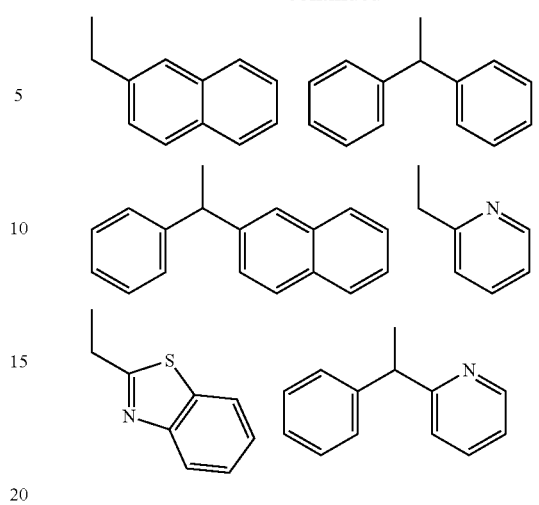

(5) Alkenyl Group Containing at Least One Aromatic Ring Selected from the Group Consisting of Aromatic Hydrocarbon Ring and Aromatic Heterocyclic Ring

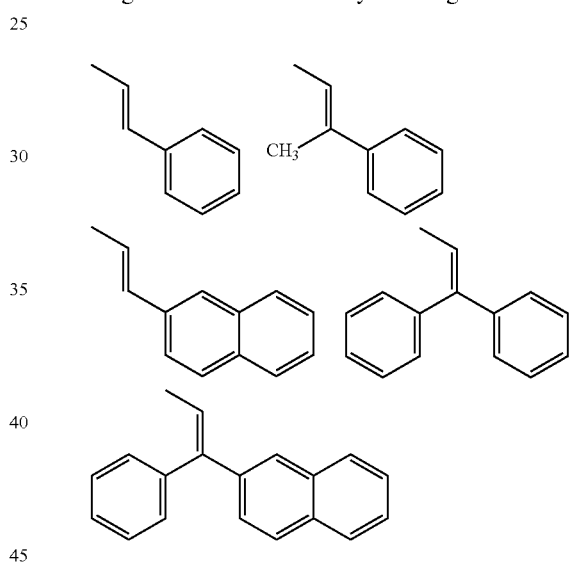

(6) Alkynyl Group Containing at Least One Aromatic Ring Selected from the Group Consisting of Aromatic Hydrocarbon Ring and Aromatic Heterocyclic Ring

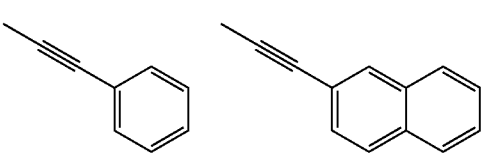

Among the above-mentioned $A^r$'s, an aromatic hydrocarbon ring group of 6 to 30 carbon atoms, an aromatic heterocyclic ring group of 4 to 30 carbon atoms, or a group of 4 to 30 carbon atoms containing a combination of an aromatic hydrocarbon ring and a heterocyclic ring is preferable. Any of the following groups is more preferable.

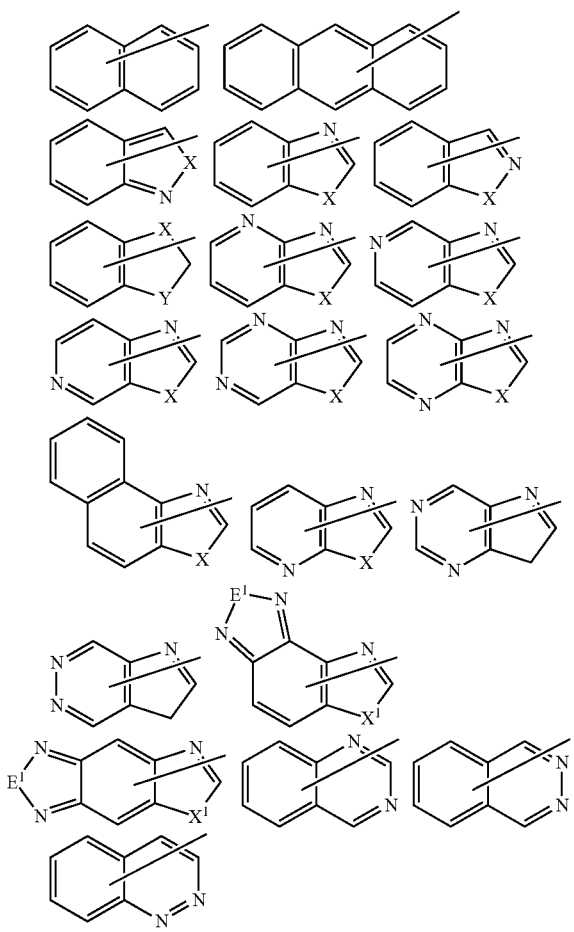

It is more preferable that $A^x$ is any of the following groups.

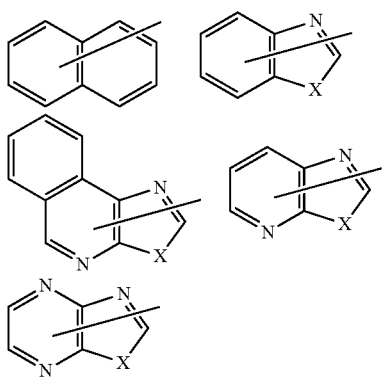

The ring contained in $A^x$ may have a substituent. Examples of such a substituent may include a halogen atom such as a fluorine atom and a chlorine atom; a cyano group; an alkyl group of 1 to 6 carbon atoms such as a methyl group, an ethyl group, and a propyl group; an alkenyl group of 2 to 6 carbon atoms such as a vinyl group and an allyl group; a halogenated alkyl group of 1 to 6 carbon atoms such as a trifluoromethyl group; a substituted amino group such as a dimethylamino group; an alkoxy group of 1 to 6 carbon atoms such as a methoxy group, an ethoxy group, and an isopropoxy group; a nitro group; an aryl group such as a phenyl group and a naphthyl group; —C(=O)—$R^8$; —C(=O)—$OR^8$; and —$SO_2R^6$. Herein, $R^8$ represents an alkyl group of 1 to 6 carbon atoms such as a methyl group and an ethyl group; or an aryl group of 6 to 14 carbon atoms such as a phenyl group. Among these, as the substituent, a halogen atom, a cyano group, an alkyl group of 1 to 6 carbon atoms, and an alkoxy group of 1 to 6 carbon atoms are preferable.

The ring contained in $A^x$ may have a plurality of the same or different substituents, and adjacent two substituents may be bound to each other to together form a ring. The formed ring may be a monocycle, or a fused polycycle.

The "carbon atoms" of the organic group of 2 to 30 carbon atoms of $A^x$ means the total number of carbon atoms of the entire organic group excluding the carbon atoms of the substituent (the meaning of which is the same in $A^y$ to be described later).

In the above-described formula (I), $A^y$ represents a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—$R^3$, —$SO_2$—$R^4$, —C(=S)NH—$R^9$, or an organic group of 2 to 30 carbon atoms containing at least one aromatic ring selected from the group consisting of an aromatic hydrocarbon ring and an aromatic heterocyclic ring. Herein, $R^3$ represents an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. $R^4$ represents an alkyl group of 1 to 20 carbon atoms, an alkenyl group of 2 to 20 carbon atoms, a phenyl group, or a 4-methylphenyl group. $R^9$ represents an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent.

Examples of the alkyl group of 1 to 20 carbon atoms in the alkyl group of 1 to 20 carbon atoms optionally having a substituent of $A^y$ may include a methyl group, an ethyl group, a n-propyl group, an isopropyl group, a n-butyl group, an isobutyl group, a 1-methylpentyl group, a 1-ethylpentyl group, a sec-butyl group, a t-butyl group, a n-pentyl group, an isopentyl group, a neopentyl group, a n-hexyl group, an isohexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group. The number of carbon atoms of the alkyl group of 1 to 20 carbon atoms optionally having a substituent is preferably 1 to 12, and more preferably 4 to 10.

Examples of the alkenyl group of 2 to 20 carbon atoms in the alkenyl group of 2 to 20 carbon atoms optionally having a substituent of $A^y$ may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an icosenyl group. The number of carbon atoms of the alkenyl group of 2 to 20 carbon atoms optionally having a substituent is preferably 2 to 12.

Examples of the cycloalkyl group of 3 to 12 carbon atoms in the cycloalkyl group of 3 to 12 carbon atoms optionally having a substituent of $A^y$ may include a cyclopropyl group, a cyclobutyl group, a cyclopentyl group, a cyclohexyl group, and a cyclooctyl group.

Examples of the alkynyl group of 2 to 20 carbon atoms in the alkynyl group of 2 to 20 carbon atoms optionally having a substituent of $A^y$ may include an ethynyl group a propynyl group, a 2-propynyl group (propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of the substituent in the alkyl group of 1 to 20 carbon atoms optionally having a substituent and the alkenyl group of 2 to 20 carbon atoms optionally having a substituent of $A^y$ may include a halogen atom such as a fluorine atom and a chlorine atom; a cyano group; a substituted amino group such as a dimethylamino group; an alkoxy group of 1 to 20 carbon atoms such as a methoxy group, an ethoxy group, an isopropoxy group, and a butoxy group; an alkoxy group of 1 to 12 carbon atoms substituted with an alkoxy group of 1 to 12 carbon atoms such as a methoxymethoxy group and a methoxyethoxy group; a nitro group; an aryl group such as a phenyl group and a naphthyl group; a cycloalkyl group of 3 to 8 carbon atoms such as a cyclopropyl group, a cyclopentyl group, and a cyclohexyl group; a cycloalkyloxy group of 3 to 8 carbon atoms such as a cyclopentyloxy group and a cyclohexyloxy group; a cyclic ether group of 2 to 12 carbon atoms such as a tetrahydrofuranyl group, a tetrahydropyranyl group, a dioxolanyl group, and a dioxanyl group; an aryloxy group of 6 to 14 carbon atoms such as a phenoxy group and a naphthoxy group; a fluoroalkoxy group of 1 to 12 carbon atoms in which at least one of them is substituted with a fluorine atom such as a trifluoromethyl group, a pentafluoroethyl group, and —$CH_2CF_3$; a benzofuryl group; a benzopyranyl group; a benzodioxolyl group; a benzodioxanyl group; —$C(=O)$—$R^{7a}$; —$C(=O)$—$OR^{7a}$; —$SO_2R^{8a}$; —$SR^{10}$; an alkoxy group of 1 to 12 carbon atoms substituted with —$SR^{10}$; and a hydroxyl group. Herein, $R^{7a}$ and $R^{10}$ each independently represents an alkyl group of 1 to 20 carbon atoms, an alkenyl group of 2 to 20 carbon atoms, a cycloalkyl group of 3 to 12 carbon atoms, or an aromatic hydrocarbon ring group of 6 to 12 carbon atoms. $R^{8a}$ represents the same groups as those for $R^4$ described above, and is an alkyl group of 1 to 20 carbon atoms, an alkenyl group of 2 to 20 carbon atoms, a phenyl group, or a 4-methylphenyl group.

Examples of the substituent in the cycloalkyl group of 3 to 12 carbon atoms optionally having a substituent of $A^y$ may include a halogen atom such as a fluorine atom and a chlorine atom; a cyano group; a substituted amino group such as a dimethylamino group; an alkyl group of 1 to 6 carbon atoms such as a methyl group, an ethyl group, and a propyl group; an alkoxy group of 1 to 6 carbon atoms such as a methoxy group, an ethoxy group, and an isopropoxy group; a nitro group; an aryl group such as a phenyl group and a naphthyl group; a cycloalkyl group of 3 to 8 carbon atoms such as a cyclopropyl group, a cyclopentyl group, and a cyclohexyl group; —$C(=O)$—$R^{7a}$; —$C(=O)$—$OR^{7a}$; —$SO_2R^{8a}$; and a hydroxyl group. Herein, $R^{7a}$ and $R^{8a}$ represent the same meaning as the previous descriptions.

Examples of the substituent in the alkynyl group of 2 to 20 carbon atoms optionally having a substituent of $A^y$ may include the same substituents as those for the alkyl group of 1 to 20 carbon atoms optionally having a substituent and the alkenyl group of 2 to 20 carbon atoms optionally having a substituent.

In the group represented by —$C(=O)$—$R^3$ of $A^y$, $R^3$ represents an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. Specific examples of these may include the same examples as those exemplified for the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent of the above-described $A^y$; and the same examples as those exemplified for the aromatic hydrocarbon ring group of 5 to 12 carbon atoms among the aromatic hydrocarbon ring groups described for the above-described $A^x$.

In the group represented by —$SO_2$—$R^4$ of $A^y$, $R^4$ represents an alkyl group of 1 to 20 carbon atoms, an alkenyl group of 2 to 20 carbon atoms, a phenyl group, or a 4-methylphenyl group. Specific examples of the alkyl group of 1 to 20 carbon atoms and the alkenyl group of 2 to 20 carbon atoms of $R^4$ may include the same groups as those exemplified for the alkyl group of 1 to 20 carbon atoms and the alkenyl group of 2 to 20 carbon atoms of the above-described $A^y$.

In the group represented by —$C(=S)NH$—$R^9$ of $A^y$, $R^9$ represents an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent. Specific examples of these may include the same examples as those exemplified for the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent of the above-described $A^y$; and the same examples as those exemplified for the aromatic group, such as an aromatic hydrocarbon ring group and an aromatic heterocyclic ring group, of 5 to 20 carbon atoms among the aromatic groups described for the above-described $A^x$.

Examples of the organic group of 2 to 30 carbon atoms having at least one aromatic ring selected from the group consisting of an aromatic hydrocarbon ring and an aromatic heterocyclic ring may include the same groups as those described for the above-described $A^x$.

Among these, $A^y$ is preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —$C(=O)$—$R^3$, —$SO_2$—$R^4$, or an organic group of 2 to 30 carbon atoms having at least one aromatic ring selected from the group consisting of an aromatic hydrocarbon ring and an aromatic heterocyclic ring. Furthermore, $A^y$ is more preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, an aromatic hydrocarbon ring group of 6 to 12 carbon atoms optionally having a substituent, an aromatic heterocyclic ring group of 3 to 9 carbon atoms optionally having a substituent, a group of 3 to 9 carbon atoms optionally having a substituent and containing a combination of an aromatic hydrocarbon ring and a heterocyclic ring, or a group represented by —C(=O)—$R^3$ or —$SO_2$—$R^4$. Herein, $R^3$ and $R^4$ represent the same meaning as the previous descriptions.

The substituent contained in the alkyl group of 1 to 20 carbon atoms optionally having a substituent, the alkenyl group of 2 to 20 carbon atoms optionally having a substituent, and the alkynyl group of 2 to 20 carbon atoms optionally having a substituent of $A^y$ is preferably a halogen atom, a cyano group, an alkoxy group of 1 to 20 carbon atoms, an alkoxy group of 1 to 12 carbon atoms substituted with an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a phenylsulfonyl group, a 4-methylphenylsulfonyl group, a benzoyl group, or —$SR^{10}$. Herein, $R^{10}$ represents the same meaning as the previous descriptions.

The substituent contained in the cycloalkyl group of 3 to 12 carbon atoms optionally having a substituent, the aromatic hydrocarbon ring group of 6 to 12 carbon atoms optionally having a substituent, the aromatic heterocyclic ring group of 3 to 9 carbon atoms optionally having a substituent, and the group of 3 to 9 carbon atoms optionally having a substituent and containing a combination of an aromatic hydrocarbon ring and a heterocyclic ring of $A^y$ is preferably a fluorine atom, an alkyl group of 1 to 6 carbon atoms, an alkoxy group of 1 to 6 carbon atom, or a cyano group.

$A^x$ and $A^y$ may form a ring together. Examples of such a ring may include an unsaturated heterocyclic ring of 4 to 30 carbon atoms optionally having a substituent and an unsaturated carbon ring of 6 to 30 carbon atoms optionally having a substituent.

The unsaturated heterocyclic ring of 4 to 30 carbon atoms and the unsaturated carbon ring of 6 to 30 carbon atoms are not particularly limited, and may or may not have aromaticity.

Examples of the ring formed by $A^x$ and $A^y$ together may include the following rings. The following rings are shown as a part represented by

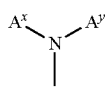

in the formula (I).

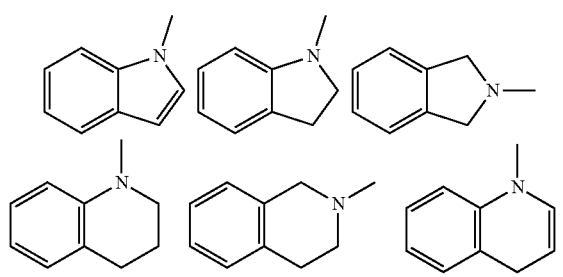

-continued

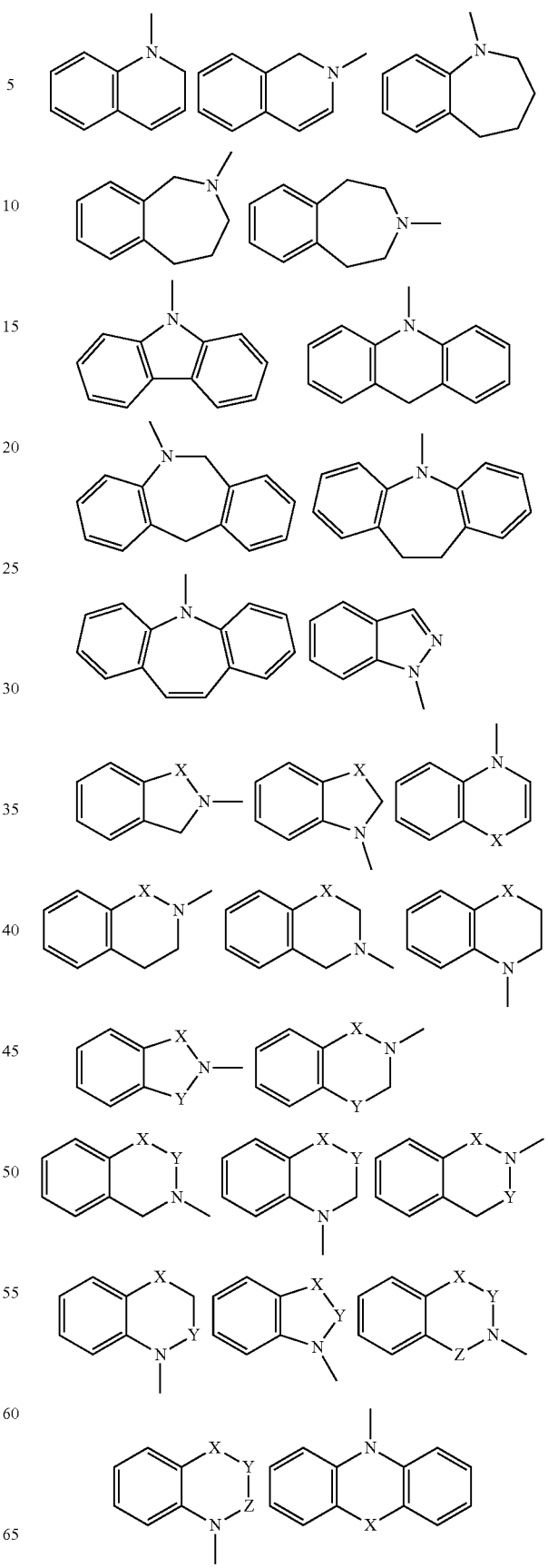

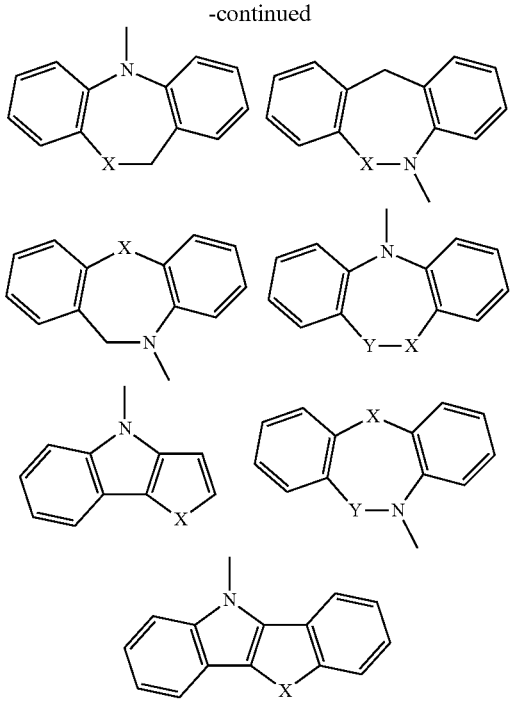

(In the formulae, X, Y, and Z represent the same meaning as the previous descriptions.)

These rings may have a substituent. Examples of such a substituent may include the same substituents as those described as the substituent of the aromatic ring contained in $A^x$.

The total number of π electrons contained in $A^x$ and $A^y$ is preferably 4 or more and 24 or less, more preferably 6 or more and 20 or less, and further more preferably 6 or more and 18 or less, from the viewpoint of more favorably expressing a desired effect of the present invention.

Examples of the preferable combination of $A^x$ and $A^y$ may include the following combinations (α) and (β).

(α) A combination in which $A^x$ is an aromatic hydrocarbon ring group of 4 to 30 carbon atoms, an aromatic heterocyclic group of 4 to 30 carbon atoms, or a group of 4 to 30 carbon atoms containing a combination of an aromatic hydrocarbon ring and a heterocyclic ring; and $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic ring group of 3 to 9 carbon atoms optionally having a substituent (a halogen atom, an alkyl group of 1 to 6 carbon atoms, an alkoxy group of 1 to 6 carbon atoms, or a cyano group), a group of 3 to 9 carbon atoms optionally having a substituent (a halogen atom, an alkyl group of 1 to 6 carbon atoms, an alkoxy group of 1 to 6 carbon atoms, or a cyano group) and containing a combination of an aromatic hydrocarbon ring and a heterocyclic ring, an alkyl group of 1 to 20 carbon atoms optionally having a substituent, an alkenyl group of 2 to 20 carbon atoms optionally having a substituent, or an alkynyl group of 2 to 20 carbon atoms optionally having a substituent, in which the substituent is any of a halogen atom, a cyano group, an alkoxy group of 1 to 20 carbon atoms, an alkoxy group of 1 to 12 carbon atoms substituted with an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $—SR^{10}$.

(β) A combination in which $A^x$ and $A^y$ together form an unsaturated heterocyclic ring or an unsaturated carbon ring.

Herein, $R^{10}$ represents the same meaning as the previous description.

Examples of the more preferable combination of $A^x$ and $A^y$ may include the following combinations (γ).

(γ) A combination in which $A^x$ is a group having any of the following structures; and $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic ring group of 3 to 9 carbon atoms optionally having a substituent (a halogen atom, an alkyl group of 1 to 6 carbon atoms, an alkoxy group of 1 to 6 carbon atoms, or a cyano group), a group of 3 to 9 carbon atoms optionally having a substituent (a halogen atom, an alkyl group of 1 to 6 carbon atoms, an alkoxy group of 1 to 6 carbon atoms, or a cyano group) and containing a combination of an aromatic hydrocarbon ring and a heterocyclic ring, an alkyl group of 1 to 20 carbon atoms optionally having a substituent, an alkenyl group of 2 to 20 carbon atoms optionally having a substituent, or an alkynyl group of 2 to 20 carbon atoms optionally having a substituent, in which the substituent is any of a halogen atom, a cyano group, an alkoxy group of 1 to 20 carbon atoms, an alkoxy group of 1 to 12 carbon atoms substituted with an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $—SR^{10}$.

Herein, $R^{10}$ represents the same meaning as the previous description.

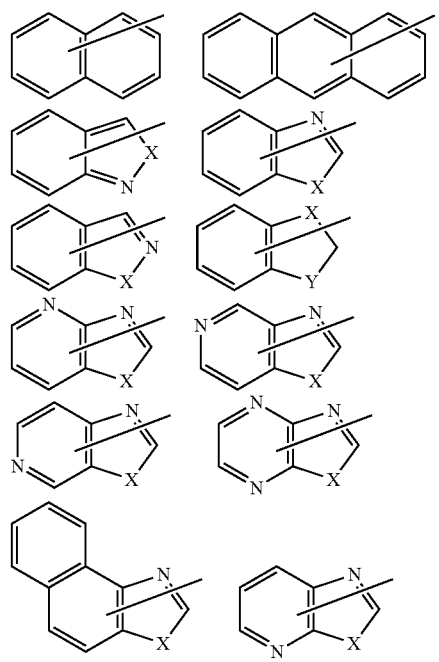

(In the formulae, X and Y represent the same meanings as the previous descriptions.)

Examples of the particularly preferable combination of A$^x$ and A$^y$ may include the following combination (δ).

(δ) A combination in which A$^x$ is a group having any of the following structures; and A$^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic ring group of 3 to 9 carbon atoms optionally having a substituent (a halogen atom, an alkyl group of 1 to 6 carbon atoms, an alkoxy group of 1 to 6 carbon atoms, or a cyano group), a group of 3 to 9 carbon atoms optionally having a substituent (a halogen atom, an alkyl group of 1 to 6 carbon atoms, an alkoxy group of 1 to 6 carbon atoms, or a cyano group) and containing a combination of an aromatic hydrocarbon ring and a heterocyclic ring, an alkyl group of 1 to 20 carbon atoms optionally having a substituent, an alkenyl group of 2 to 20 carbon atoms optionally having a substituent, or an alkynyl group of 2 to 20 carbon atoms optionally having a substituent, in which the substituent is any of a halogen atom, a cyano group, an alkoxy group of 1 to 20 carbon atoms, an alkoxy group of 1 to 12 carbon atoms substituted with an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and —SR$^{10}$.

In the following formulae, X represents the same meaning as the previous description. Herein, R$^{10}$ represents the same meaning as the previous description.

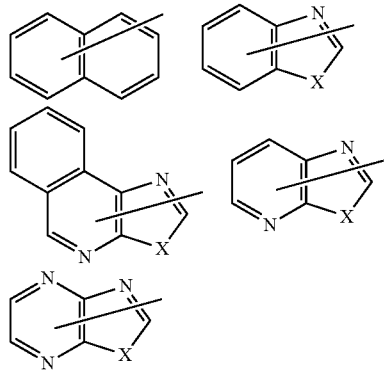

In the above-described formulae (I), A$^1$ represents a trivalent aromatic group optionally having a substituent. The trivalent aromatic group may be a trivalent carbocyclic aromatic group, or may be a trivalent heterocyclic aromatic group. From the viewpoint of more favorably expressing a desired effect of the present invention, a trivalent carbocyclic aromatic group is preferable, a trivalent benzene ring group or a trivalent naphthalene ring group is more preferable, and a trivalent benzene ring group or a trivalent naphthalene ring group represented by the following formulae is further preferable. In the following formulae, substituents Y$^1$ and Y$^2$ are described for the sake of more clearly indicating the binding state (Y$^1$ and Y$^2$ represent the same meanings as the previous descriptions, and the same applies to the following descriptions).

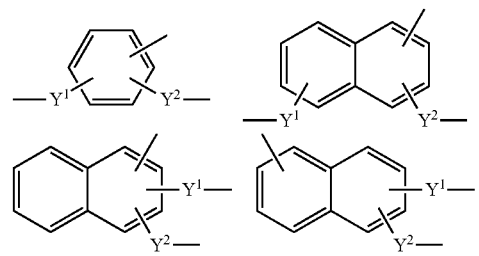

Among these, A$^1$ is more preferably a group represented by the following formulae (A11) to (A25), further preferably a group represented by the formulae (A11), (A13), (A15), (A19), and (A23), and particularly preferably a group represented by the formulae (A11) and (A23).

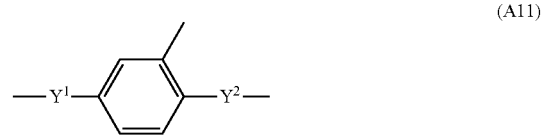
(A11)

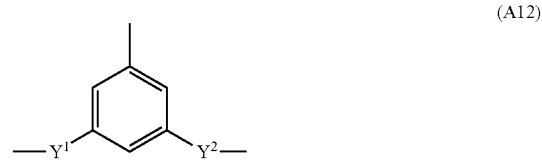
(A12)

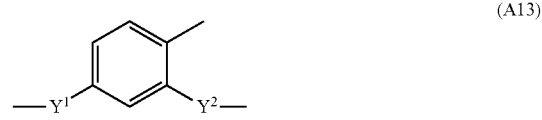
(A13)

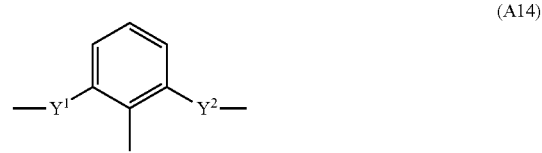
(A14)

(A15)

(A16)

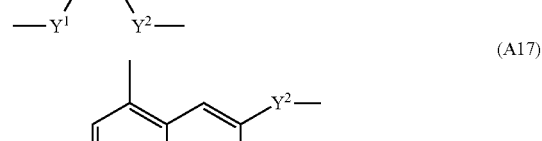
(A17)

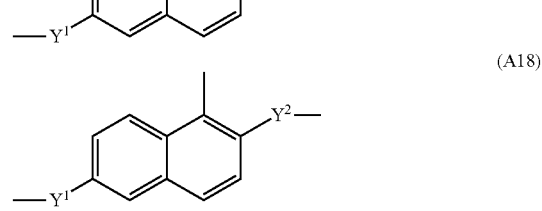
(A18)

(A19) 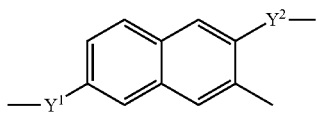

(A20) 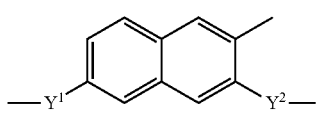

(A21) 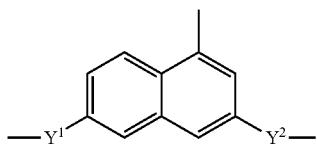

(A22) 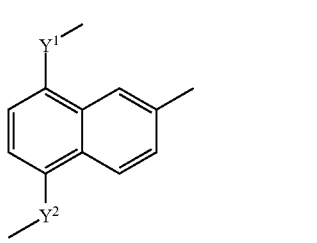

(A23) 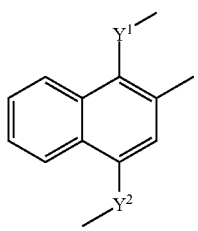

(A24) 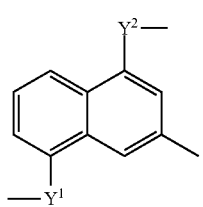

(A25) 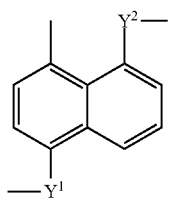

Examples of the substituent that the trivalent aromatic group of $A^1$ may have may include the same substituents as those described as the substituent of the aromatic ring of the above-described $A^x$. It is preferable that $A^1$ does not have a substituent.

In the above-described formula (I), $A^2$ and $A^3$ each independently represent a divalent alicyclic hydrocarbon group of 3 to 30 carbon atoms optionally having a substituent. Examples of the divalent alicyclic hydrocarbon group of 3 to 30 carbon atoms may include a cycloalkanediyl group of 3 to 30 carbon atoms and a divalent alicyclic fused ring group of 10 to 30 carbon atoms.

Examples of the cycloalkanediyl group of 3 to 30 carbon atoms may include a cyclopropanediyl group; a cyclobutanediyl group such as a cyclobutane-1,2-diyl group and a cyclobutane-1,3-diyl group; a cyclopentanediyl group such as a cyclopentane-1,2-diyl group and a cyclopentane-1,3-diyl group; a cyclohexanediyl group such as a cyclohexane-1,2-diyl group, a cyclohexane-1,3-diyl group, and a cyclohexane-1,4-diyl group; a cycloheptanediyl group such as a cycloheptane-1,2-diyl group, a cycloheptane-1,3-diyl group, and a cycloheptane-1,4-diyl group; a cyclooctanediyl group such as a cyclooctane-1,2-diyl group, a cyclooctane-1,3-diyl group, a cyclooctane-1,4-diyl group, and a cyclooctane-1,5-diyl group; a cyclodecanediyl group such as a cyclodecane-1,2-diyl group, a cyclodecane-1,3-diyl group, a cyclodecane-1,4-diyl group, and a cyclodecane-1,5-diyl group; a cyclododecanediyl group such as a cyclododecane-1,2-diyl group, a cyclododecane-1,3-diyl group, a cyclododecane-1,4-diyl group, and a cyclododecane-1,5-diyl group; a cyclotetradecanediyl group such as a cyclotetradecane-1,2-diyl group, a cyclotetradecane-1,3-diyl group, a cyclotetradecane-1,4-diyl group, a cyclotetradecane-1,5-diyl group, and a cyclotetradecane-1,7-diyl group; and a cycloeicosanediyl group such as a cycloeicosane-1,2-diyl group and a cycloeicosane-1,10-diyl group.

Examples of the divalent alicyclic fused ring group of 10 to 30 carbon atoms may include: a decalindiyl group such as a decalin-2,5-diyl group and a decalin-2,7-diyl group; an adamantanediyl group such as an adamantane-1,2-diyl group and an adamantane-1,3-diyl group; and a bicyclo[2.2.1]heptanediyl group such as a bicyclo[2.2.1]heptane-2,3-diyl group, a bicyclo[2.2.1]heptane-2,5-diyl group, and a bicyclo[2.2.1]heptane-2,6-diyl group.

These divalent alicyclic hydrocarbon groups may have a substituent at an optional position. Examples of the substituent may include the same substituents as those described as the substituent of the aromatic ring of the above-described $A^x$.

Among these, $A^2$ and $A^3$ are preferably a divalent alicyclic hydrocarbon group of 3 to 12 carbon atoms, more preferably a cycloalkanediyl group of 3 to 12 carbon atoms, further preferably a group represented by the following formulae (A31) to (A34), and particularly preferably a group represented by the following formula (A32).

 (A31)

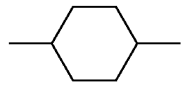 (A32)

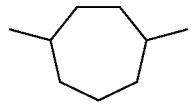 (A33)

-continued

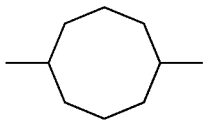
(A34)

The divalent alicyclic hydrocarbon group of 3 to 30 carbon atoms may have a cis stereoisomer and a trans stereoisomer based on a difference in the steric configuration of a carbon atom bound to $Y^1$ and $Y^3$ (or $Y^2$ and $Y^4$). For example, a cyclohexane-1,4-diyl group may have, as indicated below, a cis isomer (A32a) and a trans isomer (A32b).

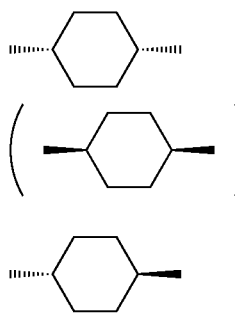
(A32a)

(A32b)

The aforementioned divalent alicyclic hydrocarbon group of 3 to 30 carbon atoms may be a cis isomer, a trans isomer, or a cis and trans isomeric mixture. Among these, a trans isomer or a cis isomer is preferable, and a trans isomer is more preferable, from the viewpoint of favorable orientation quality.

In the above-described formula (I), $A^4$ and $A^5$ each independently represent a divalent aromatic group of 6 to 30 carbon atoms optionally having a substituent. The aromatic group of $A^4$ and $A^5$ may be monocyclic or polycyclic. Specific preferable examples of $A^4$ and $A^5$ may be as follows.

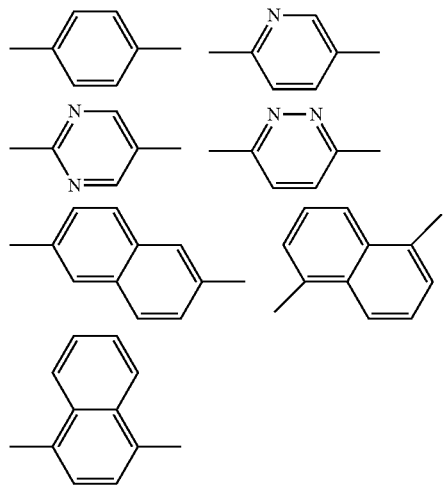

The divalent aromatic group of $A^4$ and $A^5$ may optionally have a substituent at an optional position. Examples of the substituent may include a halogen atom, a cyano group, a hydroxyl group, an alkyl group of 1 to 6 carbon atoms, an alkoxy group of 1 to 6 carbon atoms, a nitro group, and a —C(=O)—OR$^{8b}$ group. Herein, R$^{8b}$ is an alkyl group of 1 to 6 carbon atoms. Among these, as the substituent, a halogen atom, an alkyl group of 1 to 6 carbon atoms, and an alkoxy group are preferable. The halogen atom is more preferably a fluorine atom. The alkyl group of 1 to 6 carbon atoms is more preferably a methyl group, an ethyl group, or a propyl group. The alkoxy group is more preferably a methoxy group or an ethoxy group.

Among these, from the viewpoint of more favorably expressing a desired effect of the present invention, $A^4$ and $A^5$ each independently are more preferably a group represented by the following formula (A41), (A42) or (A43) optionally having a substituent, and particularly preferably a group represented by the formula (A41) optionally having a substituent.

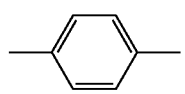
(A41)

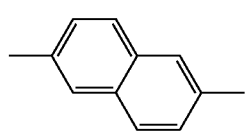
(A42)

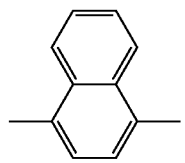
(A43)

In the above-described formula (I), $Q^1$ represents a hydrogen atom or an alkyl group of 1 to 6 carbon atoms optionally having a substituent. Examples of the alkyl group of 1 to 6 carbon atoms optionally having a substituent may include an alkyl group of 1 to 6 carbon atoms among the alkyl groups of 1 to 20 carbon atoms optionally having a substituent which have been described for the above-described A$^y$. Among these, $Q^1$ is preferably a hydrogen atom or an alkyl group of 1 to 6 carbon atoms, and more preferably a hydrogen atom or a methyl group.

In the above-described formula (I), m and n each independently represent 0 or 1. In particular, m is preferably 1, and n is preferably 1.

The compound (I) may be produced by a reaction indicated below.

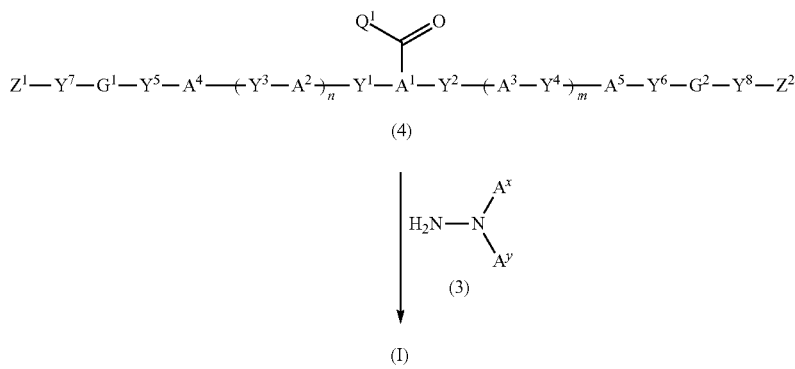

(4)

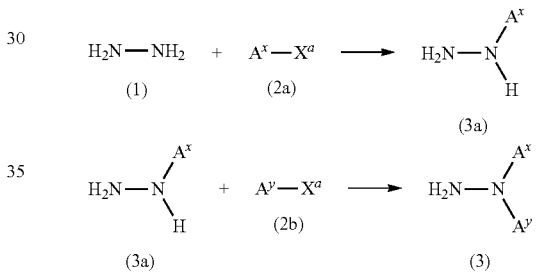

(In the formula, $Y^1$ to $Y^8$, $G^1$, $G^2$, $Z^1$, $Z^2$, $A^x$, $A^y$, $A^1$ to $A^5$, $Q^1$, m, and n represent the same meanings as the previous descriptions.)

As indicated in the aforementioned reaction formula, a hydrazine compound represented by the formula (3) and a carbonyl compound represented by the formula (4) may be reacted to produce a compound (I). Hereinafter, the hydrazine compound represented by the formula (3) may be appropriately referred to as a "hydrazine compound (3)". The carbonyl compound represented by the formula (4) may be appropriately referred to as a "carbonyl compound (4)".

In the aforementioned reaction, the molar ratio of "hydrazine compound (3):carbonyl compound (4)" is preferably 1:2 to 2:1, and more preferably 1:1.5 to 1.5:1. When the reaction is performed with such a molar ratio, the target compound (I) can be produced in a highly selective manner with a high yield.

In this case, the reaction system may contain an acid catalyst that is, for example, an organic acid such as (±)-10-camphorsulfonic acid and paratoluenesulfonic acid and an inorganic acid such as hydrochloric acid and sulfuric acid. By using the acid catalyst, the reaction time may be shortened and the yield may be improved. The amount of the acid catalyst relative to 1 mol of the carbonyl compound (4) is usually 0.001 mol to 1 mol. The acid catalyst may be added as it is to the reaction system, or may be added as a solution in which it is dissolved in an appropriate solution.

As the solvent used for this reaction, a solvent which is inactive to the reaction may be used. Examples of the solvent may include: an alcohol-based solvent such as methyl alcohol, ethyl alcohol, n-propyl alcohol, isopropyl alcohol, n-butyl alcohol, isobutyl alcohol, sec-butyl alcohol, and t-butyl alcohol; an ether-based solvent such as diethyl ether, tetrahydrofuran, 1,2-dimethoxyethane, 1,4-dioxane, and cyclopentyl methyl ether; an ester-based solvent such as ethyl acetate, propyl acetate, and methyl propionate; an aromatic hydrocarbon-based solvent such as benzene, toluene, and xylene; an aliphatic hydrocarbon-based solvent such as n-pentane, n-hexane, and n-heptane; an amide-based solvent such as N,N-dimethylformamide, N-methylpyrrolidone, and hexamethylphosphoric triamide; a sulfur-containing solvent such as dimethylsulfoxide and sulfolane; and a mixed solvent containing two or more thereof. Among these, an alcohol-based solvent, an ether-based solvent, and a mixed solvent of an alcohol-based solvent and an ether-based solvent are preferable.

The using amount of the solvent is not particularly limited, and may be set in consideration of the type of the used compound, the reaction scale, and the like. The specific using amount of the solvent relative to 1 g of the hydrazine compound (3) is usually 1 g to 100 g.

Usually the reaction may smoothly proceed in the temperature range of not lower than −10° C. and not higher than the boiling point of the used solvent. The reaction time for each reaction is usually several minutes to several hours depending on the reaction scale.

The hydrazine compound (3) may be produced in the following manner.

(In the formula, $A^x$ and $A^y$ represent the same meanings as the previous descriptions, and $X^a$ represents a leaving group such as a halogen atom, a methanesulfonyloxy group, and a p-toluenesulfonyloxy group.)

As indicated in the aforementioned reaction formula, a compound represented by the formula (2a) and a hydrazine (1) may be reacted in an appropriate solvent to obtain a corresponding hydrazine compound (3a). The molar ratio of "compound (2a):hydrazine (1)" in this reaction is preferably 1:1 to 1:20, and more preferably 1:2 to 1:10. Furthermore, the hydrazine compound (3a) and a compound represented by the formula (2b) may be reacted to obtain a hydrazine compound (3).

The hydrazine (1) to be used is usually a monohydrate. As the hydrazine (1), a commercially available product as it is may be used.

As the solvent used for this reaction, a solvent which is inactive to the reaction may be used. Examples of the solvent may include: an alcohol-based solvent such as methyl alcohol, ethyl alcohol, n-propyl alcohol, isopropyl alcohol, n-butyl alcohol, isobutyl alcohol, sec-butyl alcohol, and t-butyl alcohol; an ether-based solvent such as diethyl ether, tetrahydrofuran, 1,2-dimethoxyethane, 1,4-dioxane, and cyclopentyl methyl ether; an aromatic hydrocarbon-based solvent such as benzene, toluene, and xylene; an aliphatic hydrocarbon-based solvent such as n-pentane, n-hexane, and n-heptane; an amide-based solvent such as N,N-dimethylformamide, N-methylpyrrolidone, and hexamethylphosphoric triamide; a sulfur-containing solvent such as dimethylsulfoxide and sulfolane; and a mixed solvent containing two or more thereof. Among these, an alcohol-based solvent, an ether-based solvent, and a mixed solvent of an alcohol-based solvent and an ether-based solvent are preferable.

The using amount of the solvent is not particularly limited, and may be set in consideration of the type of the used compound, the reaction scale, and the like. The specific using amount of the solvent relative to 1 g of hydrazine is usually 1 g to 100 g.

Usually the reaction may smoothly proceed in the temperature range of not lower than −10° C. and not higher than the boiling point of a used solvent. The reaction time for each reaction is usually several minutes to several hours depending on the reaction scale.

The hydrazine compound (3) may also be produced by reducing a diazonium salt (5) using publicly known method in the following manner.

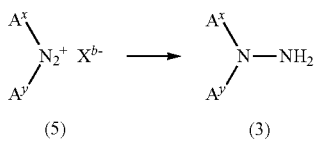

In the formula (5), $A^x$ and $A^y$ represent the same meanings as the previous descriptions. $X^{b-}$ represents an anion which is a counter ion to diazonium. Examples of $X^{b-}$ may include: inorganic anions such as a hexafluorophosphate ion, a hydrofluoroborate ion, a chloride ion, and a sulfate ion; and organic anions such as a polyfluoroalkylcarboxylate ion, a polyfluoroalkylsulfate ion, a tetraphenylborate ion, an aromatic carboxylate ion, and an aromatic sulfonate ion.

Examples of a reductant used in the reaction may include a metal salt reductant. The metal salt reductant is generally a compound containing low valent metal or a compound having a metal ion and a hydride source (see "Yuki Gosei Jikkenhou Handbook (Organic synthesis experimental method handbook)", 1990, edited by The Society of Synthetic Organic Chemistry, Japan, published by Maruzen Co., Ltd., p. 810).

Examples of the metal salt reductant may include $NaAlH_4$, $NaAlH_p(Or)_q$ (wherein p and q each independently are an integer of 1 to 3, p+q is 4, and r represents an alkyl group of 1 to 6 carbon atoms), $LiAlH_4$, $iBu_2AlH$, $LiBH_4$, $NaBH_4$, $SnCl_2$, $CrCl_2$, and $TiCl_3$. Herein, "iBu" represents an isobutyl group.

In the reduction reaction, any of publicly known reaction conditions may be adopted. For example, the reaction may be performed under conditions described in documents including Japanese Patent Application Laid-Open No. 2005-336103 A, Shin Jikken Kagaku Koza (New course of experimental chemistry), 1978, published by Maruzen Co., Ltd., vol. 14, and Jikken Kagaku Koza (Course of experimental chemistry), 1992, published by Maruzen Co., Ltd., vol. 20.

The diazonium salt (5) may be produced from a compound such as aniline by an ordinary method.

The carbonyl compound (4) may be produced, for example, by appropriately bonding and modifying a plurality of publicly known compounds having a desired structure by any combination of reactions of forming an ether bond (—O—), an ester bond (—C(=O)—O— and —O—C(=O)—), a carbonate bond (—O—C(=O)—O—), and an amide bond (—C(=O)NH— and —NH—C(=O)—).

The ether bond may be formed in the follow manner.

(i) A compound represented by a formula: D1-hal (hal represents a halogen atom, and the same applies to the following descriptions) and a compound represented by a formula: D2-OMet (Met represents an alkaline metal (mainly sodium), and the same applies to the following descriptions) are mixed and condensed (Williamson synthesis). In the formulae, D1 and D2 are any organic groups (the same applies to the following descriptions).

(ii) A compound represented by a formula: D1-hal and a compound represented by a formula: D2-OH are mixed and condensed in the presence of a base such as sodium hydroxide and potassium hydroxide.

(iii) A compound represented by a formula: D1-J (J represents an epoxy group) and a compound represented by a formula: D2-OH are mixed and condensed in the presence of a base such as sodium hydroxide and potassium hydroxide.

(iv) A compound represented by a formula: D1-OFN (OFN represents a group having an unsaturated bond) and a compound represented by a formula: D2-OMet are mixed in the presence of a base such as sodium hydroxide and potassium hydroxide for addition reaction.

(v) A compound represented by a formula: D1-hal and a compound represented by a formula: D2-OMet are mixed and condensed in the presence of copper or cuprous chloride (Ullmann condensation).

The ester bond and the amide bond may be formed in the following manner.

(vi) A compound represented by a formula: D1-COOH and a compound represented by a formula: D2-OH or $D2-NH_2$ are subjected to dehydration condensation in the presence of a dehydration-condensation agent (N,N-dicyclohexylcarbodiimide and the like).

(vii) A halogenating agent is allowed to act on a compound represented by a formula: D1-COOH to obtain a compound represented by a formula: D1-CO-hal, and the resultant product is reacted with a compound represented by a formula: D2-OH or $D2-NH_2$ in the presence of a base.

(viii) An acid anhydride is allowed to act on a compound represented by a formula: D1-COOH to obtain a mixed acid anhydride, and the resultant product is reacted with a compound represented by a formula: D2-OH or $D2-NH_2$.

(ix) A compound represented by a formula: D1-COOH and a compound represented by a formula: D2-OH or $D2-NH_2$ are subjected to dehydration condensation in the presence of a base catalyst or an acid catalyst.

More specifically, the carbonyl compound (4) may be produced by a method indicated in the following reaction formula.

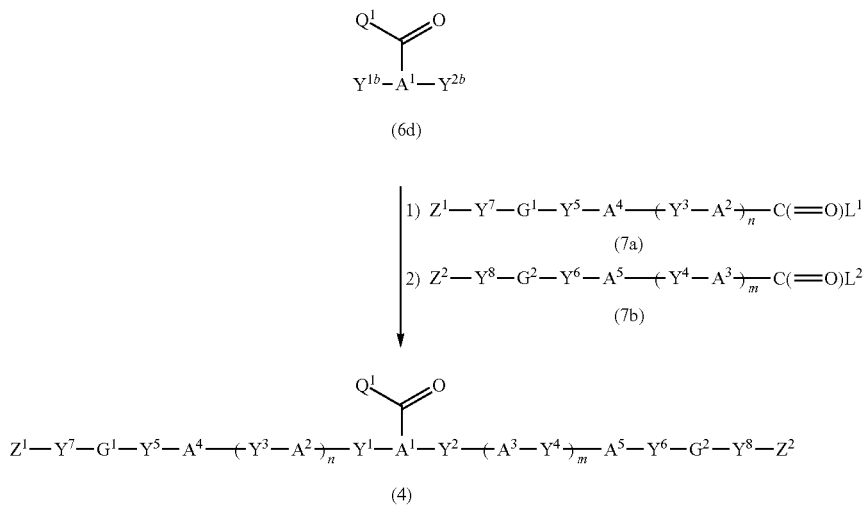

(In the formula, $Y^1$ to $Y^8$, $G^1$, $G^2$, $Z^1$, $Z^2$, $A^1$ to $A^5$, $Q^1$, m, and n represent the same meanings as the previous descriptions. $L^1$ and $L^2$ each independently represent a leaving group such as a hydroxyl group, a halogen atom, a methanesulfonyloxy group, and a p-toluenesulfonyloxy group. —$Y^{1b}$ represents a group which can react with -$L^1$ to become —$Y^1$—, and —$Y^{2b}$ represents a group which can react with -$L^2$ to become —$Y^2$—.)

As indicated in the aforementioned reaction formula, through formation reaction of an ether bond (—O—), an ester bond (—C(=O)—O—, —O—C(=O)—), or a carbonate bond (—O—C(=O)—O—), a compound represented by the formula (6d) may be reacted with a compound represented by the formula (7a), and subsequently with a compound represented by the formula (7b), to produce the carbonyl compound (4).

As a specific example, a method for producing a compound (4') in which $Y^1$ is a group represented by a formula: $Y^{11}$—C(=O)—O—, and a group represented by a formula: $Z^2$—$Y^8$-$G^2$-$Y^6$-$A^5$-$(Y^4$-$A^3)_m$-$Y^2$— is the same as a group represented by a formula: $Z^1$—$Y^7$-$G^1$-$Y^5$-$A^4$-$(Y^3$-$A^2)_n$-$Y^1$— will be shown below.

$Y^{11}$ represents a group which allows $Y^{11}$—C(=O)—O— to become $Y^1$. $Y^1$ represents the same meaning as the previous description.)

As indicated in the aforementioned reaction formula, a dihydroxy compound represented by the formula (6) (compound (6)) and a compound represented by the formula (7) (compound (7)) may be reacted to produce the compound (4'). The molar ratio of "compound (6):compound (7)" in this reaction is preferably 1:2 to 1:4, and more preferably 1:2 to 1:3. When the reaction is performed with such a molar ratio, the target compound (4') can be produced in a highly selective manner with a high yield.

When the compound (7) is a compound including a hydroxyl group as $L^1$ (carboxylic acid), it can be reacted in the presence of a dehydration-condensation agent such as 1-ethyl-3-(3-dimethylaminopropyl)carbodiimide hydrochloride and dicyclohexylcarbodiimide to obtain a target product. The using amount of the dehydration-condensation agent relative to 1 mol of the compound (7) is usually 1 mol to 3 mol.

When the compound (7) is a compound including a hydroxyl group as $L^1$ (carboxylic acid), it can also be reacted

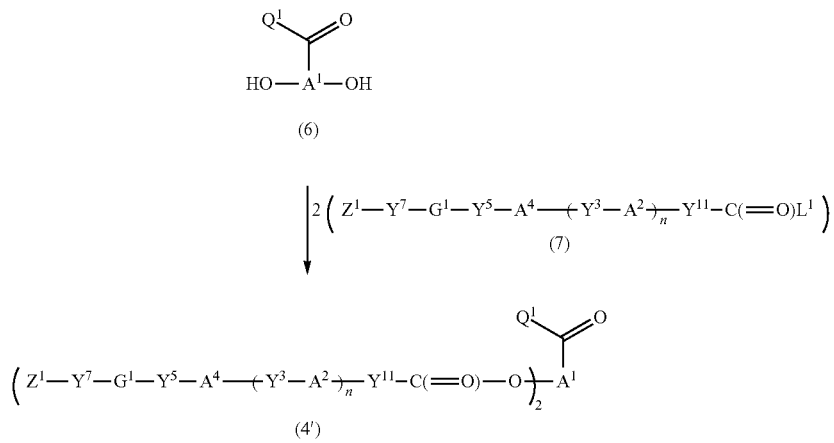

(In the formula, $Y^3$, $Y^5$, $Y^7$, $G^1$, $Z^1$, $A^1$, $A^2$, $A^4$, $Q^1$, n, and $L^1$ represent the same meanings as the previous descriptions.

in the presence of a sulfonyl halide such as methanesulfonyl chloride and p-toluenesulfonyl chloride and a base such as triethylamine, diisopropylethylamine, pyridine, and 4-(dimethylamino)pyridine to obtain a target product. The using amount of the sulfonyl halide relative to 1 mol of the compound (7) is usually 1 mol to 3 mol. The using amount of the base relative to 1 mol of the compound (7) is usually 1 mol to 3 mol. In this case, a compound including a sulfonyloxy group as $L^1$ in the above-described formula (7) (mixed acid anhydride) may be isolated to perform the following reaction.

Furthermore, when the compound (7) is a compound including a halogen atom as $L^1$ (acid halide), it may be reacted in the presence of a base to obtain a target product. Examples of the base may include: an organic base such as triethylamine and pyridine; and an inorganic base such as sodium hydroxide, sodium carbonate, and sodium bicarbonate. The using amount of the base relative to 1 mol of the compound (7) is usually 1 mol to 3 mol.

Examples of the solvent used in the aforementioned reaction may include: a chlorine-based solvent such as chloroform and methylene chloride; an amide-based solvent such as N-methylpyrrolidone, N,N-dimethylformamide, N,N-dimethylacetamide, and hexamethylphosphoric triamide; an ether solvent such as 1,4-dioxane, cyclopentyl methyl ether, tetrahydrofuran, tetrahydropyran, and 1,3-dioxolane; a sulfur-containing solvent such as dimethylsulfoxide and sulfolane; an aromatic hydrocarbon-based solvent such as benzene, toluene, and xylene; an aliphatic hydrocarbon-based solvent such as n-pentane, n-hexane, and n-octane; an alicyclic hydrocarbon-based solvent such as cyclopentane and cyclohexane; and a mixed solvent containing two or more thereof.

The using amount of the solvent is not particularly limited, and may be set in consideration of the type of a used compound, the reaction scale, and the like. The specific using amount of the solvent relative to 1 g of the hydroxy compound (6) is usually 1 g to 50 g.

Many of the compounds (6) are publicly known substances, and may be produced by a publicly known method. For example, they may be produced by a method indicated in the following reaction formula (see, for example, WO 2009/042544 A, and The Journal of Organic Chemistry, 2011, 76, 8082-8087). As the compound (6), a commercially available product may be used after, if desired, purification.

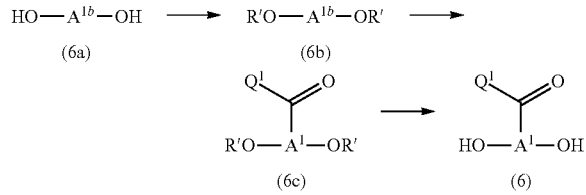

(In the formula, $A^1$ and $Q^1$ represent the same meanings as the previous descriptions, $A^{1b}$ represents a divalent aromatic group which is capable of being formylated or acylated to become $A^1$, and $R^1$ represents a protecting group of a hydroxyl group, for example, an alkyl group of 1 to 6 carbon atoms such as a methyl group and an ethyl group, and an alkoxy alkyl group of 2 to 6 carbon atoms such as a methoxymethyl group.)

As indicated in the aforementioned reaction formula, a hydroxyl group of a dihydroxy compound represented by the formula (6a) (1,4-dihydroxybenzene, 1,4-dihydroxynaphthalene, and the like) is alkylated to obtain a compound represented by the formula (6b). After that, the ortho position of an OR' group is formylated or acylated by a publicly known method to obtain a compound represented by the formula (6c). Then, the resultant product may be deprotected (dealkylated) to produce the target compound (6).

Alternatively, as the compound (6), a commercially available product may be used as it is, or may be optionally purified.

Many of the compounds (7) are publicly known compounds, and may be produced by, for example, optionally combining formation reactions of an ether bond (—O—), an ester bond (—C(=O)—O—, —O—C(=O)—), a carbonate bond (—O—C(=O)—O—), and an amide bond (—C(=O)—NH—, —NH—C(=O)—) to adequately bind and modify a plurality of publicly known compounds having desired structures.

For example, when the compound (7) is a compound represented by the following formula (7') (compound (7')), it may be produced with a dicarboxylic acid represented by the formula (9') (compound (9')) in the following manner.

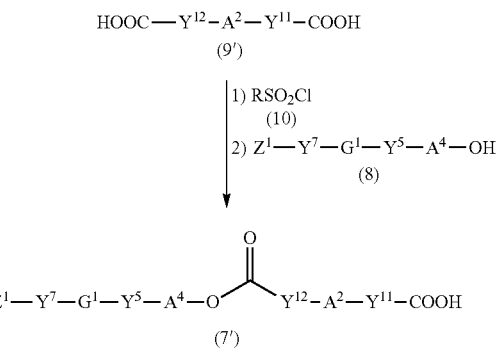

(In the formula, $Y^5$, $Y^7$, $G^1$, $Z^1$, $A^2$, $A^4$, and $Y^{11}$ represent the same meanings as the previous descriptions. $Y^{12}$ represents a group which allows —O—C(=O)—$Y^{12}$ to become $Y^3$. R represents: an alkyl group such as a methyl group and an ethyl group; and an aryl group optionally having a substituent such as a phenyl group and a p-methylphenyl group.)

First, a sulfonyl chloride represented by the formula (10) is reacted to a compound (9') in the presence of a base such as triethylamine and 4-(dimethylamino)pyridine. Subsequently, to the reaction mixture, a compound (8) and a base such as triethylamine and 4-(dimethylamino)pyridine are added for reaction.

The using amount of the sulfonyl chloride relative to 1 equivalent of the compound (9') is usually 0.5 equivalent to 0.7 equivalent.

The using amount of the compound (8) relative to 1 equivalent of the compound (9') is usually 0.5 equivalent to 0.6 equivalent.

The using amount of the base relative to 1 equivalent of the compound (9') is usually 0.5 equivalent to 0.7 equivalent.

The reaction temperature is 20° C. to 30° C., and the reaction time is several minutes to several hours depending on the reaction scale and the like.

Examples of the solvent used in the aforementioned reaction may include those exemplified as the solvent used for producing the compound (4'). In particular, an ether solvent is preferable.

The using amount of the solvent is not particularly limited, and may be set in consideration of the type of the used compound, the reaction scale, and the like. The specific using amount of the solvent relative to 1 g of the compound (9') is usually 1 g to 50 g.

Regarding any of the reactions, an ordinary post-treatment operation in organic synthetic chemistry may be performed after the end of the reaction. If desired, a target product may be isolated by performing publicly known isolation and purification methods such as column chromatography, recrystallization, and distillation.

The structure of the target compound may be identified by measurement such as NMR spectrometry, IR spectrometry, and mass spectrometry, elemental analysis, and the like.

[3. Fluorine-Containing Surfactant]

The liquid crystal composition of the present invention contains the fluorine-containing surfactant that contains a fluorine atom in the molecule. Log P (i.e., 1-octanol/water partition coefficient) of the fluorine-containing surfactant is usually less than 5.0, preferably less than 4.5, and more preferably less than 4.0. When the fluorine-containing surfactant having such small log P is used in combination with the polymerizable liquid crystal compound with reverse wavelength distribution, the surface state and orientation quality of the liquid crystal cured layer can be improved. The lower limit of the log P is not particularly limited, and is usually 2.0 or more, preferably 2.5 or more, and more preferably 3.0 or more.

Log P of the fluorine-containing surfactant may be measured by the following measurement method.

A sample solution containing 1% by weight of the fluorine-containing surfactant is prepared and HPLC/ELSD analysis (high performance liquid chromatography/evaporative light scattering detection analysis) is performed by a method that is generally in accordance with JIS 7260-117:2006 {measurement of partition coefficient (1-octanol/water)–high performance liquid chromatography}. Thus, the elution time (r.t.) is measured. Separately, a standard compound having known log P value that is described in JIS 7260-117:2006 is subjected to HPLC/ELSD analysis in the same manner as measurement for the fluorine-containing surfactant. Thus, the elution time (r.t.) is measured. A calibration line showing a relationship between the elution time and log P is made on the basis of the measurement result of the standard compound. After that, the elution time measured for the fluorine-containing surfactant is applied to the calibration line. Thus, log P of the fluorine-containing surfactant is determined.

As the specific conditions of the measurement method, conditions described in description of Examples may be employed.

It is preferable that the molecular weight of the fluorine-containing surfactant is less than 2,000. Such a small molecular weight of the fluorine-containing surfactant is usually indicative that the fluorine-containing surfactant is not an oligomer having two or more repeating units but a monomer. When the fluorine-containing surfactant having the aforementioned range of log P is a monomer, the surface state and orientation quality of the liquid crystal cured layer can be particularly improved.

The application property of a conventional liquid crystal composition containing a polymerizable liquid crystal compound with reverse wavelength distribution is poor. Therefore, in order to obtain a liquid crystal cured layer having a favorable surface state, employment of an application method that easily improves the surface state, such as a spin coating method, is required. However, a spin coating method is unsuitable for continuous application of the liquid crystal composition onto a long-length substrate. Therefore, employment thereof as an industrial production method is not realistic. On the other hand, when the liquid crystal composition containing the fluorine-containing surfactant having the specific range of log P as described above and the polymerizable liquid crystal compound with reverse wavelength distribution in combination is used, the surface state of the liquid crystal cured layer can be easily improved. Accordingly, a liquid crystal cured layer of high quality can be produced by an application method suitable for mass production, such as a die coating method.

When the fluorine-containing surfactant having the specific range of log P as described above is used, the orientation quality of a liquid crystal cured layer produced from the liquid crystal composition can be improved. Improved orientation quality of the liquid crystal cured layer means that the molecules of the polymerizable liquid crystal compound with reverse wavelength distribution of the liquid crystal cured layer are highly oriented in the same direction and the number of orientation defects is small. The action of the fluorine-containing surfactant on the behavior of molecules of the polymerizable liquid crystal compound with reverse wavelength distribution is not necessarily obvious. From results of many experiments performed by the present inventors, the inventors found that the range of log P of the fluorine-containing surfactant used in combination with the polymerizable liquid crystal compound with reverse wavelength distribution influences facilitation of orientation of molecules of the polymerizable liquid crystal compound with reverse wavelength distribution. The relationship of log P of the fluorine-containing surfactant and the facilitation of orientation of molecules of the polymerizable liquid crystal compound with reverse wavelength distribution has been first proved by investigation based on the experiments by the inventors. Thus it can be said that this relationship is an action that cannot be predicted from technical common sense in prior art.

The inventors prepared a liquid crystal composition containing the fluorine-containing surfactant in combination with a polymerizable liquid crystal compound with forward wavelength distribution, and examined the surface state and orientation quality of a liquid crystal cured layer produced from the liquid crystal composition. As a result, favorable results of one or both of the surface state and orientation quality were not obtained. Therefore, an effect of improving both the surface state and orientation quality of a liquid crystal cured layer by using the fluorine-containing surfactant is an effect that is specifically obtained by the liquid crystal composition containing the polymerizable liquid crystal compound with reverse wavelength distribution.

The ratio of the fluorine atom in molecules of the fluorine-containing surfactant is preferably 5% by weight or more, more preferably 10% by weight or more, and particularly preferably 15% by weight or more, and is preferably 30% by weight or less, more preferably 25% by weight or less, and particularly preferably 20% by weight or less. When the ratio of the fluorine atom falls within the aforementioned range, both the surface state and orientation quality of the liquid crystal cured layer is likely to be particularly improved. Further, the phase difference unevenness and thickness unevenness of the liquid crystal cured layer can be suppressed.

The ratio of fluorine atom in the molecules of the surfactant may be measured by the following method.

The surfactant as a sample is weighed and combusted in a combustion tube of an analyzer. A gas generated by the combustion is absorbed in an appropriate solution, to obtain an absorption liquid. Subsequently, a part of the absorption liquid is analyzed by ion chromatography. The ratio of fluorine atom in the molecules of the surfactant may thereby be measured.

The fluorine-containing surfactant usually contains a fluoroalkyl group. The fluoroalkyl group is preferably a perfluoroalkyl group and particularly preferably a —$C_6F_{13}$ group from the viewpoint of significantly exerting effects of improving the surface state and orientation quality and suppressing the phase difference unevenness and thickness unevenness.

The fluorine-containing surfactant may or may not have polymerizability. A fluorine-containing surfactant having polymerizability may be polymerized during polymerization of the polymerizable liquid crystal compound with reverse wavelength distribution. Therefore, the fluorine-containing surfactant having polymerizability is contained in a part of molecule of a polymer in the liquid crystal cured layer to be produced from the liquid crystal composition of the present invention.

Examples of the fluorine-containing surfactant may include SURFLON series manufactured by AGC Seimi Chemical Co., Ltd. (S242, S243, etc.), MEGAFACE series manufactured by DIC Corporation (F444, etc.), and FTERGENT series manufactured by NEOS COMPANY LIMITED (FTX-212M, FTX-215M, FTX-250, FTX-251, etc.). As the fluorine-containing surfactant, one type thereof may be solely used, and two or more types thereof may also be used in combination at any ratio.

The amount of the fluorine-containing surfactant is preferably 0.05 part by weight or more, more preferably 0.1 part by weight or more, and particularly preferably 0.3 part by weight or more, and is preferably 5.0 parts by weight or less, more preferably 1.0 part by weight or less, and particularly preferably 0.5 part by weight or less, relative to 100 parts by weight of the polymerizable liquid crystal compound with reverse wavelength distribution. When the amount of the surfactant is equal to or more than the lower limit value of the aforementioned range, coating property of the liquid crystal composition on the support surface at the time of application becomes favorable. When the amount is equal to or less than the upper limit value of the aforementioned range, the surface state can be effectively improved while maintaining the orientation quality.

[4. Optional Component]

The liquid crystal composition of the present invention may contain optional components in combination with the polymerizable liquid crystal compound with reverse wavelength distribution and the fluorine-containing surfactant. As these optional components, one type thereof may be solely used, and two or more types thereof may also be used in combination at any ratio.

For example, the liquid crystal composition may contain a solvent. As the solvent, a solvent capable of dissolving the polymerizable liquid crystal compound with reverse wavelength distribution is preferable. As such a solvent, an organic solvent may usually be used. Examples of the organic solvents may include a ketone solvent such as cyclopentanone, cyclohexanone, methyl ethyl ketone, acetone, and methyl isobutyl ketone; an acetic acid ester solvent such as butyl acetate, and amyl acetate; a halogenated hydrocarbon solvent such as chloroform, dichloromethane, and dichloroethane; an ether solvent such as 1,4-dioxane, cyclopentyl methyl ether, tetrahydrofuran, tetrahydropyran, 1,3-dioxolane, and 1,2-dimethoxyethane; and an aromatic hydrocarbon such as toluene, xylene, and mesitylene.

As the solvent, one type thereof may be solely used, and two or more types thereof may also be used in combination at any ratio. For example, it is preferable to use a combination of a ketone solvent such as cyclopentanone and an ether solvent such as 1,3-dioxolane. When combined in this manner, the weight ratio (ketone solvent/ether solvent) of the ketone solvent relative to the ether solvent is preferably 10/90 or more, more preferably 30/70 or more, and particularly preferably 40/60 or more, and is preferably 90/10 or less, more preferably 70/30 or less, and particularly preferably 50/50 or less. By using the ketone solvent and the ether solvent in the above-described weight ratio, it is possible to suppress occurrence of defects at the time of application.

The boiling point of the solvent is preferably 60° C. to 250° C., and more preferably 60° C. to 150° C., from the viewpoint of excellent handling properties.

The amount of the solvent is preferably 300 parts by weight or more, more preferably 350 parts by weight or more, and particularly preferably 400 parts by weight or more, and is preferably 700 parts by weight or less, more preferably 600 parts by weight or less, and particularly preferably 500 parts by weight or less, relative to 100 parts by weight of the polymerizable liquid crystal compound with reverse wavelength distribution. When the amount of the solvent is equal to or more than the lower limit value of the aforementioned range, it is possible to suppress the generation of impurity matter. When the amount thereof is equal to or less than the upper limit value of the aforementioned range, it is possible to reduce the drying load.

For example, the liquid crystal composition may include a polymerization initiator. The type of the polymerization initiator may be selected according to the type of the polymerizable liquid crystal compound with reverse wavelength distribution. For example, when the polymerizable liquid crystal compound with reverse wavelength distribution is radically polymerizable, a radical polymerization initiator may be used. When the polymerizable liquid crystal compound with reverse wavelength distribution is anionically polymerizable, an anionic polymerization initiator may be used. When the polymerizable liquid crystal compound with reverse wavelength distribution is cationically polymerizable, a cationic polymerization initiator may be used.

As the radical polymerization initiator, there may be used any of: a thermal radical generator which is a compound that generates by heating an active species capable of initiating polymerization of a polymerizable liquid crystal compound with reverse wavelength distribution; and a photo radical generator which is a compound that generates an active species capable of initiating polymerization of a polymerizable liquid crystal compound with reverse wavelength distribution by exposure to light such as visible light, UV light (such as i rays), far-UV light, electron beams, and X-rays. Among these, a photo radical generator is suitable as the radical polymerization initiator.

Examples of the photo radical generator may include an acetophenone-based compound, a biimidazole-based compound, a triazine-based compound, an O-acyloxim-based compound, an onium salt-based compound, a benzoin-based compound, a benzophenone-based compound, an α-diketone-based compound, a polynuclear quinone-based compound, a xanthone-based compound, a diazo-based compound, and an imide sulfonate-based compound. These compounds can generate an active radical, an active acid, or both of an active radical and an active acid by exposure to light.

Specific examples of the acetophenone-based compound may include 2-hydroxy-2-methyl-1-phenylpropane-1-one, 2-methyl-1-[4-(methylthio)phenyl]-2-morpholinopropane-1-one, 2-benzyl-2-dimethylamino-1-(4-morpholinophenyl)-butane-1-one, 1-hydroxycyclohexyl.phenylketone, 2,2-dimethoxy-1,2-diphenylethane-1-one, 1,2-octanedione, and 2-benzyl-2-dimethylamino-4'-morpholinobutyrophenone.

Specific examples of the biimidazole-based compound may include 2,2'-bis(2-chlorophenyl)-4,4',5,5'-tetrakis(4-ethoxycarbonylphenyl)-1,2'-biimidazole, 2,2'-bis(2-bromophenyl)-4,4',5,5'-tetrakis(4-ethoxycarbonylphenyl)-1,2'-biimidazole, 2,2'-bis(2-chlorophenyl)-4,4',5,5'-tetraphenyl-1,2'-biimidazole, 2,2'-bis(2,4-dichlorophenyl)-4,4',5,5'-tetraphenyl-1,2'-biimidazole, 2,2'-bis(2,4,6-trichlorophenyl)-4,4',5,5'-tetraphenyl-1,2'-biimidazole, 2,2'-bis(2-bromophenyl)-4,4',5,5'-tetraphenyl-1,2'-biimidazole, 2,2'-bis(2,4-dibromophenyl)-4,4',5,5'-tetraphenyl-1,2'-biimidazole, and 2,2'-bis(2,4,6-tribromophenyl)-4,4',5,5'-tetraphenyl-1,2'-biimidazole.

When the biimidazole-based compound is used as a polymerization initiator, a hydrogen donor may be used in combination with the biimidazole-based compound to further improve the sensitivity. Herein, the "hydrogen donor" means a compound which is capable of providing a hydrogen atom to a radical generated from the biimidazole-based compound by exposure to light. As the hydrogen donor, the following examples of a mercaptan-based compound and an amine-based compound are preferable.

Examples of the mercaptan-based compound may include 2-mercaptobenzothiazole, 2-mercaptobenzoxazole, 2-mercaptobenzoimidazole, 2,5-dimercapto-1,3,4-thiadiazole, and 2-mercapto-2,5-dimethylaminopyridine. Examples of the amine-based compound may include 4,4'-bis(dimethylamino)benzophenone, 4,4'-bis(diethylamino)benzophenone, 4-diethylaminoacetophenone, 4-dimethylaminopropiophenone, ethyl-4-dimethylaminobenzoate, 4-dimethylaminobenzoic acid, and 4-dimethylaminobenzonitrile.

Specific examples of the triazine-based compound may include a triazine-based compound having a halomethyl group such as 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, and 2-(4-n-butoxyphenyl)-4,6-bis(trichloromethyl)-s-triazine.

Specific examples of the O-acyloxim-based compound may include 1-[4-(phenylthio)phenyl]-heptane-1,2-dione 2-(O-benzoyloxim), 1-[4-(phenylthio)phenyl]-octane-1,2-dione 2-(O-benzoyloxim), 1-[4-(benzoyl)phenyl]-octane-1,2-dione 2-(O-benzoyloxim), 1-[9-ethyl-6-(2-methylbenzoyl)-9H-carbazole-3-yl]-ethanone 1-(O-acetyloxim), 1-[9-ethyl-6-(3-methylbenzoyl)-9H-carbazole-3-yl]-ethanone 1-(O-acetyloxim), 1-(9-ethyl-6-benzoyl-9H-carbazole-3-yl)-ethanone 1-(O-acetyloxim), ethanone-1-[9-ethyl-6-(2-methyl-4-tetrahydrofuranylbenzoyl)-9.H.-carbazole-3-yl]-1-(O-acetyloxim), ethanone-1-[9-ethyl-6-(2-methyl-4-tetrahydropyranylbenzoyl)-9.H.-carbazole-3-yl]-1-(O-acetyloxim), ethanone-1-[9-ethyl-6-(2-methyl-5-tetrahydrofuranylbenzoyl)-9.H.-carbazole-3-yl]-1-(O-acetyloxim), ethanone-1-[9-ethyl-6-(2-methyl-5-tetrahydropyranylbenzoyl)-9.H.-carbazole-3-yl]-1-(O-acetyloxim), ethanone-1-[9-ethyl-6-{2-methyl-4-(2,2-dimethyl-1,3-dioxolanyl)benzoyl}-9.H.-carbazole-3-yl]-1-(O-acetyloxim), ethanone-1-[9-ethyl-6-(2-methyl-4-tetrahydrofuranylmethoxybenzoyl)-9.H.-carbazole-3-yl]-1-(O-acetyloxim), ethanone-1-[9-ethyl-6-(2-methyl-4-tetrahydropyranylmethoxybenzoyl)-9.H.-carbazole-3-yl]-1-(O-acetyloxim), ethanone-1-[9-ethyl-6-(2-methyl-5-tetrahydrofuranylmethoxybenzoyl)-9.H.-carbazole-3-yl]-1-(O-acetyloxim), ethanone, 1-[9-ethyl-6-(2-methylbenzoyl)-9H-carbazole-3-yl]-1-(O-acetyloxim), ethanone-1-[9-ethyl-6-(2-methyl-5-tetrahydropyranylmethoxybenzoyl)-9.H.-carbazole-3-yl]-1-(O-acetyloxim), and ethanone-1-[9-ethyl-6-{2-methyl-4-(2,2-dimethyl-1,3-dioxolanyl)methoxybenzoyl}-9.H.-carbazole-3-yl]-1-(O-acetyloxim).

As the photo-radical generator, a commercially available product as it is may be used. Specific examples thereof may include trade name: Irgacure 907, trade name: Irgacure 184, trade name: Irgacure 369, trade name: Irgacure 651, trade name: Irgacure 819, trade name: Irgacure 907, trade name: Irgacure 379, and trade name: Irgacure OXE02, manufactured by BASF Corporation, and trade name: Adecaoptomer N1919, manufactured by ADEKA Corporation.

Examples of the anionic polymerization initiators may include an alkyllithium compound; a monolithium or monosodium salt of, for example, biphenyl, naphthalene, and pyrene; and a polyfunctional initiator such as a dilithium salt and a trilithium salt.

Examples of the cationic polymerization initiators may include a protonic acid such as sulfuric acid, phosphoric acid, perchloric acid, and trifluoromethanesulfonic acid; a Lewis acid such as boron trifluoride, aluminum chloride, titanium tetrachloride, and tin tetrachloride; and an aromatic onium salt or aromatic onium salt in combination with a reductant.

As the polymerization initiator, one type thereof may be solely used, and two or more types thereof may also be used in combination at any ratio.

The amount of the polymerization initiator is preferably 0.1 part by weight or more, and more preferably 0.5 part by weight or more, and is preferably 30 parts by weight or less, and more preferably 10 parts by weight or less, relative to 100 parts by weight of the polymerizable liquid crystal compound with reverse wavelength distribution. When the amount of the polymerization initiator falls within the aforementioned range, polymerization of the polymerizable liquid crystal compound with reverse wavelength distribution can be efficiently allowed to proceed.

Further, examples of optional components that may be contained in the liquid crystal composition may include additives such as a polymerizable compound other than the polymerizable liquid crystal compound with reverse wavelength distribution; a metal; a metal complex; a metal oxide such as titanium oxide; a colorant such as a dye or a pigment; a luminescent material such as a fluorescent material or a phosphorescent material; a leveling agent; a thioxo agent; a gelling agent; a polysaccharide; an ultraviolet absorber; an infrared absorber; an antioxidant; and an ion exchange resin. One type of these may be solely used, and two or more types thereof may also be used in combination at any ratio.

The amount of the additive may be freely set within a range that does not significantly impair the advantageous effects of the present invention. Specifically, the amount of the additive may be 0.1 part by weight to 20 parts by weight relative to 100 parts by weight of the polymerizable liquid crystal compound with reverse wavelength distribution.

[5. Method for Producing Liquid Crystal Cured Layer]

A liquid crystal cured layer may be produced using the liquid crystal composition of the present invention. The liquid crystal cured layer is a layer formed of a cured product of the liquid crystal composition of the present invention.

The liquid crystal cured layer may be produced by a method including the following steps (i) to (iii).

(i) A step of applying the liquid crystal composition of the present invention onto a supporting surface to form a layer of the liquid crystal composition.

(ii) A step of giving orientation to the polymerizable liquid crystal compound with reverse wavelength distribution contained in the layer of the liquid crystal composition.

(iii) A step of curing the layer of the liquid crystal composition.

As the supporting surface, any surface capable of supporting the layer of the liquid crystal composition may be used. As such a supporting surface, a flat surface having no concave or convex portions is usually used from the viewpoint of improving the surface state of the liquid crystal cured layer. As the supporting surface, a surface of a long-length substrate is preferably used from the viewpoint of enhancing productivity of the liquid crystal cured layer. The "long-length" herein means a shape having a length that is 5 times or more the width and preferably 10 times or more the width, and specifically means a shape of a film having such a length that the film is capable of being wound up into a roll shape for storage or conveyance. The upper limit of the length is not particularly limited, and for example, may be 10,000 or less times the width.

As the substrate, a resin film is usually used. Examples of the resin may include resins containing various types of polymers. Example of the polymers may include an alicyclic structure-containing polymer such as a norbornene-based polymer, a cellulose ester, a polyvinyl alcohol, a polyimide, UV-transmitting acrylic, a polycarbonate, a polysulfone, a polyether sulfone, an epoxy polymer, a polystyrene, and a combination thereof. Among these, an alicyclic structure-containing polymer and a cellulose ester are preferable, and an alicyclic structure-containing polymer is more preferable from the viewpoint of transparency, low hygroscopicity, size stability, and light weight properties.

In order to promote orientation of the polymerizable liquid crystal compound with reverse wavelength distribution in the layer of the liquid crystal composition, the substrate may be subjected to a treatment of imparting an orientation regulating force to the surface of the substrate. Herein, the orientation regulating force of a surface means properties of the surface that is capable of giving orientation to the polymerizable liquid crystal compound with reverse wavelength distribution in the liquid crystal composition.

Examples of the treatment of imparting an orientation regulating force may include a rubbing treatment. When the rubbing treatment is performed on the surface of the substrate, an orientation regulating force of homogeneously giving orientation to the polymerizable liquid crystal compound with reverse wavelength distribution can be imparted to the surface. Examples of the method of rubbing treatment may include a method in which the surface of the substrate is rubbed in a constant direction with a roll wrapped with cloth or felt formed of synthetic fibers such as nylon or natural fibers such as cotton. In order to remove minute powders generated during the rubbing treatment to make the treated surface clean, it is preferable that the treated surface is cleaned after the rubbing treatment with a cleaning liquid such as isopropyl alcohol.

Examples of the treatment of imparting an orientation regulating force may also include a treatment of forming an orientation layer on the surface of the substrate. The orientation layer is a layer in which the polymerizable liquid crystal compound with reverse wavelength distribution in the liquid crystal composition may be oriented in one direction in the plane. When the orientation layer is provided, the layer of the liquid crystal composition may be formed on a surface of the orientation layer.

The orientation layer usually contains a polymer such as a polyimide, a polyvinyl alcohol, a polyester, a polyarylate, a polyamideimide, and a polyetherimide. The orientation layer may be produced by applying a solution containing such a polymer onto the substrate in a film shape, drying the solution, and performing a rubbing treatment in one direction. As the method other than the rubbing treatment, a method of irradiating the surface of the orientation layer with polarized ultraviolet light may also impart an orientation regulating force to the orientation layer. The thickness of the orientation layer is preferably 0.001 µm to 5 µm, and more preferably 0.001 µm to 1 µm.

Examples of the treatment of imparting an orientation regulating force may also include a stretching treatment. When a stretching treatment is performed under conditions suitable for the substrate, molecules of the polymer contained in the substrate can be oriented. Thus, an orientation regulating force of giving orientation to the polymerizable liquid crystal compound with reverse wavelength distribution in an orientation direction of molecules of the polymer contained in the substrate can be imparted to the surface of the substrate.

It is preferable that the stretching of the substrate is performed whereby anisotropy is imparted to the substrate and the substrate can thereby express a slow axis. Thereby an orientation regulating force of giving orientation to the polymerizable liquid crystal compound with reverse wavelength distribution in a direction parallel or perpendicular to the slow axis of the substrate is usually imparted to the surface of the substrate. For example, when a resin having a positive intrinsic birefringence value is used as a material for the substrate, orientation of the molecules of the polymer contained in the substrate in a stretching direction usually results in expression of a slow axis parallel to the stretching direction. Therefore, the orientation regulating force of giving orientation to the polymerizable liquid crystal compound with reverse wavelength distribution in the direction parallel to the slow axis of the substrate is imparted to the surface of the substrate. Accordingly, the stretching direction of the substrate may be set according to a desired orientation direction in which the polymerizable liquid crystal compound with reverse wavelength distribution is to be oriented. In particular, it is preferable that the slow axis of the substrate is expressed at an angle of 40° to 50° relative to a winding direction of the substrate. Herein, the winding direction of the substrate is a direction in which a long-length substrate is wound, and usually means a direction parallel to the lengthwise direction of the substrate.

The stretching ratio may be set so that the birefringence $\Delta n$ of the substrate after stretching falls within a desired range. The birefringence $\Delta n$ of the substrate after stretching is preferably 0.000050 or more and more preferably 0.000070 or more, and is preferably 0.007500 or less and more preferably 0.007000 or less. When the birefringence $\Delta n$ of the substrate after stretching is equal to or more than the lower limit value of the aforementioned range, a favorable orientation regulating force can be imparted to the surface of the substrate. When the birefringence $\Delta n$ is equal to or less than the upper limit value of the aforementioned range, the retardation of the substrate can be decreased. Therefore, the liquid crystal cured layer and the substrate may be used in combination without peeling the substrate from the liquid crystal cured layer for a variety of applications.

The stretching may be performed by using a stretching machine such as a tenter stretching machine.

Examples of the treatment for imparting an orientation regulating force may include an ion beam orientation treatment. In the ion beam orientation treatment, an ion beam of $Ar^+$ or the like is made incident on the substrate, and thereby an orientation regulating force can be imparted to the surface of the substrate.

The thickness of the substrate is not particularly limited, and is preferably 1 µm or more, more preferably 5 µm or more, and particularly preferably 30 µm or more, and is preferably 1,000 µm or less, more preferably 300 µm or less, and particularly preferably 100 µm or less from the viewpoint of enhancing productivity and facilitating thickness reduction and weight reduction.

After the aforementioned substrate is prepared if necessary, the step of applying the liquid crystal composition of the present invention onto a supporting surface such as the surface of the substrate to form the layer of the liquid crystal composition is performed. Examples of the method for applying the liquid crystal composition may include a curtain coating method, an extrusion coating method, a roll coating method, a spin coating method, a dip coating method, a bar coating method, a spray coating method, a slide coating method, a printing coating method, a gravure coating method, a die coating method, a gap coating method, and a dipping method. The thickness of the layer of the liquid crystal composition to be applied may be appropriately set according to a desired thickness required for a liquid crystal cured layer.

After the layer of the liquid crystal composition is formed, the step of giving orientation to the polymerizable liquid crystal compound with reverse wavelength distribution contained in the layer is performed. In this step, usually the layer of the liquid crystal composition is subjected to an orientation treatment, to thereby give orientation to the polymerizable liquid crystal compound with reverse wavelength distribution in a direction corresponding to the orientation regulating force of the supporting surface. The orientation treatment is usually performed by heating the layer of the liquid crystal composition at a specific orientation temperature. The conditions for the orientation treatment may be appropriately set according to the properties of the liquid crystal composition to be used. Specifically, the conditions for the orientation treatment may be conditions of treatment for 30 seconds to 5 minutes under a temperature condition of 50° C. to 160° C.

However, the orientation of the polymerizable liquid crystal compound with reverse wavelength distribution may be achieved immediately by applying the liquid crystal composition of the present invention. Therefore, the orientation treatment for giving orientation to the polymerizable liquid crystal compound with reverse wavelength distribution may not be necessarily performed on the layer of the liquid crystal composition.

After the polymerizable liquid crystal compound with reverse wavelength distribution is oriented, the step of curing the layer of the liquid crystal composition to obtain a liquid crystal cured layer is performed. In this step, usually the polymerizable liquid crystal compound with reverse wavelength distribution is polymerized to cure the layer of the liquid crystal composition. As the method for polymerizing the polymerizable liquid crystal compound with reverse wavelength distribution, a method suitable for the properties of components contained in the liquid crystal composition may be selected. Examples of the polymerization method may include an irradiation method with an active energy ray and a thermal polymerization method. Among these, the irradiation method with an active energy ray is preferable since a polymerization reaction can proceed at room temperature without heating. Herein, the active energy ray for irradiation may include light such as visible light, ultraviolet light, and infrared light, and any energy ray such as an electron beam.

In particular, an irradiation method with light such as ultraviolet light is preferable since the operation is simple. The temperature during irradiation with ultraviolet light is preferably equal to or lower than the glass transition temperature of the substrate. The temperature is preferably 150° C. or lower, more preferably 100° C. or lower, and particularly preferably 80° C. or lower. The lower limit of temperature during irradiation with ultraviolet light may be 15° C. or higher. The irradiation intensity of ultraviolet light is preferably 0.1 mW/cm$^2$ or more and more preferably 0.5 mW/cm$^2$ or more, and is preferably 1,000 mW/cm$^2$ or less and more preferably 600 mW/cm$^2$ or less.

The method for producing a liquid crystal cured layer may include any optional steps, in addition to the aforementioned steps.

For example, the method for producing a liquid crystal cured layer may include a step of drying the layer of the liquid crystal composition before the step of polymerizing the polymerizable liquid crystal compound with reverse wavelength distribution. Such drying may be achieved by a drying method such as natural drying, drying under heating, drying under reduced pressure, and drying under heating and reduced pressure. By the drying, the solvent can be removed from the layer of the liquid crystal composition.

For example, the method for producing a liquid crystal cured layer may include a step of peeling the produced liquid crystal cured layer from the supporting surface.

[6. Liquid Crystal Cured Layer]

By the aforementioned production method, a liquid crystal cured layer formed of the cured product of the liquid crystal composition of the present invention is obtained. The liquid crystal cured layer includes the polymer obtained by polymerizing the polymerizable liquid crystal compound with reverse wavelength distribution. Since the polymer is a polymer obtained by polymerizing the polymerizable liquid crystal compound with reverse wavelength distribution with orientation of molecules in a liquid crystal phase maintained, the polymer has homogeneous orientation regularity. Herein, "having homogeneous orientation regularity" means that long-axis directions of mesogens of molecules of the polymer are aligned in a certain direction parallel to a surface of the liquid crystal cured layer. The long-axis directions of mesogens of molecules of the polymer are the long-axis direction of mesogen of the polymerizable liquid crystal compound with reverse wavelength distribution that corresponds to the polymer. When the liquid crystal cured layer includes a plurality of types of mesogens having different orientation directions such as in a case of using the compound (I) as the polymerizable liquid crystal compound with reverse wavelength distribution, the aforementioned alignment direction is a direction in which mesogens having the longest length among the mesogens are aligned.

Such a liquid crystal cured layer usually has a slow axis that is parallel to the alignment direction of the aforementioned polymer according to the orientation regularity of the polymer. The presence or absence of homogeneous orientation regularity of the polymer obtained by polymerizing the polymerizable liquid crystal compound with reverse wavelength distribution and the alignment direction thereof may be confirmed by measurement of the slow axis direction using a phase difference meter typified by AxoScan (manufactured by Axometrics, Inc.) and measurement of retardation distribution of each incidence angle in the slow axis direction.

The slow axis direction of the liquid crystal cured layer may be optionally set according to the applications of the liquid crystal cured layer. For example, it is preferable that the liquid crystal cured layer having a long-length shape such as the liquid crystal cured layer produced using the long-length substrate has a slow axis at an angle of 40° to 50° relative to the lengthwise direction of the liquid crystal cured layer. A linear polarizer is usually produced as a long-length film having an absorption axis parallel to the lengthwise direction of the linear polarizer and a transmission axis perpendicular to the lengthwise direction. When the liquid crystal cured layer has a slow axis at an angle of 40° to 50° relative to the lengthwise direction thereof, a circularly polarizing plate including the linear polarizer and the liquid crystal cured layer can be easily produced by a roll-to-roll method.

Since the liquid crystal cured layer contains the polymer obtained by polymerizing the polymerizable liquid crystal compound with reverse wavelength distribution, the liquid crystal cured layer has birefringence with reverse wavelength distribution. Therefore, the liquid crystal cured layer can have retardation with reverse wavelength distribution. Herein, the retardation with reverse wavelength distribution refers to a retardation in which a retardation Re(450) at a wavelength of 450 nm, a retardation Re(550) at a wavelength of 550 nm, and retardation Re(650) at a wavelength of 650 nm usually satisfy the following expression (3), and preferably the following expression (4). When the liquid crystal cured layer has a retardation with reverse wavelength distribution, the liquid crystal cured layer can uniformly express a function over a wide bandwidth for optical applications such as a ¼ wave plate or a ½ wave plate.

$$Re(450) < Re(650) \quad (3)$$

$$Re(450) < Re(550) < Re(650) \quad (4)$$

The specific range of retardation of the liquid crystal cured layer may be optionally set according to the applications of the liquid crystal cured layer. For example, when it is desired that the liquid crystal cured layer functions as a ¼ wave plate, the retardation Re(550) of the liquid crystal cured layer is preferably 80 nm or more, more preferably 100 nm or more, and particularly preferably 120 nm or more, and is preferably 180 nm or less, more preferably 160 nm or less, and particularly preferably 150 nm or less. For example, when it is desired that the liquid crystal cured layer functions as a ½ wave plate, the retardation Re(550) of the liquid crystal cured layer is preferably 245 nm or more, more preferably 265 nm or more, and particularly preferably 270 nm or more, and is preferably 305 nm or less, more preferably 285 nm or less, and particularly preferably 280 nm or less.

Since the liquid crystal cured layer is produced using the liquid crystal composition of the present invention, the liquid crystal cured layer has excellent surface state. Herein, the liquid crystal cured layer having excellent surface state means a liquid crystal cured layer with a surface shape that has reduced unevenness and defects, and has smoothness.

Since the liquid crystal cured layer is produced using the liquid crystal composition of the present invention, the liquid crystal cured layer has excellent orientation quality. Herein, the liquid crystal cured layer having excellent orientation quality refers to a liquid crystal cured layer with small number of orientation defects of the polymer that is obtained by polymerizing the polymerizable liquid crystal compound with reverse wavelength distribution contained in the liquid crystal cured layer.

Since both the surface state and orientation quality can be improved as described above, the liquid crystal cured layer can significantly improve in-plane uniformity of a retardation.

The thickness of the liquid crystal cured layer may be appropriately set so that characteristics such as a retardation can fall within a desired range. For example, the thickness of the liquid crystal cured layer is preferably 0.5 μm or more and more preferably 1.0 μm or more, and is preferably 10 μm or less and more preferably 7 μm or less.

[7. Application of Liquid Crystal Cured Layer]

The application of the liquid crystal cured layer is optional. It is preferable that the liquid crystal cured layer is used alone or in combination with an optional film as an optical film.

Examples of suitable optical film may include wave plates such as a ¼ wave plate and a ½ wave plate. The aforementioned wave plates may include only the liquid crystal cured layer. Such a wave plate having only the liquid crystal cured layer may be produced, for example, by peeling the liquid crystal cured layer formed on the substrate from the substrate and cutting the liquid crystal cured layer into a desired shape according to applications, such as a rectangle. In combination with the liquid crystal cured layer, the aforementioned wave plate may further include the substrate used in production of the liquid crystal cured layer. For example, as the wave plate including the liquid crystal cured layer and the substrate, a multilayer film including the substrate and the liquid crystal cured layer may be used as it is without peeling the liquid crystal cured layer formed on the substrate from the substrate. The wave plate may have an optional layer in addition to the liquid crystal cured layer and the substrate. Examples of the optional layer may include an adhesion layer for effecting adhesion to another member, a mat layer for improving the sliding properties of the film, a hardcoat layer such as an impact-resistant polymethacrylate resin layer, an anti-reflection layer, and an anti-fouling layer.

Another example of suitable optical films may be a circularly polarizing plate. The circularly polarizing plate includes a linear polarizer and the liquid crystal cured layer.

As the linear polarizer, any linear polarizer used in a device such as a liquid crystal display device may be used. Examples of the linear polarizer may include those obtained by giving a polyvinyl alcohol film an absorption treatment with iodine or dichromatic dye and then uniaxially stretching the polyvinyl alcohol film in a boric acid bath; and those obtained by giving a polyvinyl alcohol film an absorption treatment with iodine or dichromatic dye, stretching the polyvinyl alcohol film, and then modifying a part of polyvinyl alcohol units in the molecular chain thereof into polyvinylene units. Other examples of the linear polarizer may include a polarizer having a function of separating polarized light into reflected light and transmitted light, such as a grid polarizer, a multi-layer polarizer, and a cholesteric liquid crystal polarizer. Among these, a polarizer containing polyvinyl alcohol is preferable.

When natural light is incident on the linear polarizer, only one polarized light is transmitted. The degree of polarization of the linear polarizer is preferably 98% or more and more preferably 99% or more. The average thickness of the linear polarizer is preferably 5 μm to 80 μm.

It is preferable that the liquid crystal cured layer has such an appropriate retardation that it may function as a ¼ wave plate. The angle formed between the slow axis of the liquid crystal cured layer and a transmission axis of the linear polarizer is preferably 45° or an angle close to 45° as viewed in the thickness direction, and specifically preferably 40° to 50°.

The circularly polarizing plate may further include an optional layer, in addition to the linear polarizer and the liquid crystal cured layer.

One of applications of such a circularly polarizing plate may be an application as an anti-reflective film for a display device such as an organic electroluminescent display device. When the circularly polarizing plate is provided to the surface of a display device such that the surface on the linear polarizer side faces the viewing side, light which enters from the outside of the device can be prevented from exiting the device after reflection in the device. As a result, glare on the display surface of the display device can be suppressed. Specifically, only part of the linearly polarized light of the light having entered from the outside of the device passes through the liner polarizer, and subsequently passes through the liquid crystal cured layer, to thereby become circularly polarized light. The circularly polarized light is reflected on a constituent element which permits the light in the device to be reflected thereon (such as a reflective electrode), and thereafter passes through the liquid crystal cured layer again. In this manner, the light becomes linearly polarized light having its polarizing axis in a direction orthogonal to the polarizing axis of the incident linearly polarized light. Accordingly, the linearly polarized light does not pass through the linear polarizer. Accordingly, the anti-reflection function is achieved.

EXAMPLES

Hereinafter, the present invention will be specifically described by illustrating Examples. However, the present invention is not limited to the Examples described below. The present invention may be optionally modified for implementation without departing from the scope of claims of the present invention and the scope of their equivalents.

In the following description, "%" and "part" representing quantity are on the basis of weight, unless otherwise specified. The operation described below was performed under the conditions of normal temperature and normal pressure, unless otherwise specified.

[1. Method for Measuring Log P of Fluorine-Containing Surfactant]
(1.1. Method for Preparing Sample Solution Containing Fluorine-Containing Surfactant)

A sample solution containing 1% by weight of a fluorine-containing surfactant was prepared. As a solvent for the sample solution, tetrahydrofuran or acetonitrile was used. When the fluorine-containing surfactant before mixing with tetrahydrofuran or acetonitrile was a solution containing the fluorine-containing surfactant and a diluting solvent, the amount of tetrahydrofuran or acetonitrile was adjusted so that the content amount of the fluorine-containing surfactant in the sample solution to be obtained was 1% by weight.

(1.2. HPLC/ELSD Analysis)

The sample solution containing the fluorine-containing surfactant was subjected to HPLC/ELSD analysis under the following HPLC/ELSD analysis conditions in accordance with JIS 7260-117:2006 {measurement of partition coefficient (1-octanol/water)-high performance liquid chromatography}. Thus, the elution time (r.t.) was measured.

HPLC/ELSD Analysis Conditions
LC system: LC-20A (manufactured by Shimadzu Corporation)
Column: Inertsil ODS-3, 3.0 mm×150 mm, 5 μm (manufactured by GL Sciences Inc.)
Mobile phase: A water
B acetonitrile/tetrahydrofuran=8/2 (vol/vol)
Acetonitrile: for high performance liquid chromatography (manufactured by Kokusan Chemical Co., Ltd.)
Tetrahydrofuran: inhibitor-free, for HPLC (manufactured by SIGMA-ALDRICH)
Time program: from 0 min to 15 min B: from 30% to 100%
from 15 min to 25 min B: 100%
Column temperature: 45° C.
Flow rate: 0.8 mL/min
Injection volume: 10 μL (when the detection sensitivity of the sample is low, the injection volume was adjusted to 50 μL or 100 μL)
Detection: ELSD-LT11 (manufactured by Shimadzu Corporation) Gain6, 350 KPa, 65° C.

(1.3. Derivation of Calibration Line)

Standard compounds shown in Table 1 were prepared. The prepared standard compounds shown in Table 1 were standard compounds having known log P described in JIS7260-117:2006. A sample solution containing the respective standard compounds was prepared in the same manner as the method described in (1.1. Method Of Preparing Sample Solution Containing Fluorine-Containing Surfactant) except that the standard compounds were used instead of the fluorine-containing surfactant. Subsequently, the obtained sample solution was subjected to HPLC/ELSD analysis under the analysis conditions described in (1.2. HPLC/ELSD Analysis), to measure the elution time. The temperature of ELSD detector was set to 25° C.

TABLE 1

Standard compounds and analysis results thereof

| Standard compounds | CAS | logP | Boiling point | Elution time | Injection volume |
|---|---|---|---|---|---|
| Triphenylamine (manufactured by Kanto Chemical Co., Inc., Cica special grade) | 603-34-9 | 5.7 | 348° C. | 16.0 min | 10 μL |
| Phenanthrene (manufactured by Kanto Chemical Co., Inc., Cica first grade) | 85-01-8 | 4.5 | 375° C. | 13.6 min | 50 μL |
| Benzyl benzoate (manufactured by Kanto Chemical Co., Inc., Cica special grade) | 120-51-4 | 4.0 | 323° C. | 12.4 min | 10 μL |
| Acetanilide (manufactured by Kanto Chemical Co., Inc., Cica first grade) | 103-84-4 | 1.0 | 184° C. | 3.0 min | 10 μL |

The analysis results of the standard compounds were plotted on a coordinate system where the horizontal axis was the elution time and the vertical axis was log P, and an approximate line was made in accordance with a least-squares method. This approximate line was employed as the calibration line. The calibration line is shown in FIG. 1.

(1.4. Calculation of Log P of Fluorine-Containing Surfactant)

The elution time measured for each fluorine-containing surfactant was applied to the calibration line, to determine log P of each fluorine-containing surfactant. When, for one fluorine-containing surfactant, a plurality of peaks showing the elution time in the HPLC/ELSD analysis were detected, the peak top of a peak having the largest area was employed as the elution time of the fluorine-containing surfactant for determining the log P thereof.

[2. Method for Measuring Containing Amount of Fluorine Atom in Fluorine-Containing Surfactant]

A fluorine-containing surfactant as a sample was weighed, and combusted in a combustion tube of an analyzer. A gas generated by the combustion was absorbed in a solution, to obtain an absorption liquid. Subsequently, a part of the absorption liquid was analyzed by ion chromatography. The ratio of fluorine atom in the molecule of the fluorine-containing surfactant was thus measured. The conditions in each step are as follows.

(2.1. Combustion and Absorption Conditions)

System: AQF-2100 and GA-210 (manufactured by Mitsubishi Chemical Corporation)

Electric furnace temperature: Inlet: 900° C., Outlet: 1,000° C.

Gas: $Ar/O_2$ 200 mL/min $O_2$ 400 mL/min

Absorption liquid: solvent: $H_2O_2$ 90 μg/mL

Internal standard substance: P 4 μg/mL or Br 8 μg/mL

Amount of absorption liquid: 20 mL (2.2. Conditions of Anion Analysis by Ion Chromatography)

System: ICS1600 (manufactured by DIONEX)

Mobile phase: 2.7 mmol/L $Na_2CO_3$/0.3 mmol/L $NaHCO_3$

Flow rate: 1.50 mL/min

Detector: electric conductivity detector

Injection volume: 20 μL

[3. Method for Evaluating Surface State of Liquid Crystal Cured Layer]

A pair of linear polarizers (polarizer and analyzer) were stacked in parallel nicols on a light table. Herein, parallel nicols represents an aspect in which polarized light transmission axes of the linear polarizers are parallel.

A multilayer film produced in each of Examples and Comparative Examples was cut into a square with a side of 16 cm, to obtain a film piece for measurement. The film piece was disposed between the linear polarizers disposed on the light table as described above. At that time, the slow axis of the film piece was set at an angle of approximately 45° relative to the absorption axis of the linear polarizer as viewed in the thickness direction. Subsequently, the film piece was visually observed. The surface state of a liquid crystal cured layer was evaluated in accordance with the following criteria in proportion to uniformity of an image observed (uniformity of phase difference).

A: The entire surface was almost uniform, and unevenness and defect were not recognized.

B: The entire surface was almost uniform, but minute unevenness was slightly recognized.

C: Unevenness was clearly recognized.

D: Strong unevenness was observed on the entire surface.

Separately, a stretched substrate produced in Production Example 1 was disposed between the pair of linear polarizers disposed on the light table, and visually observed. As a result, when only the stretched substrate having no liquid crystal cured layer was used instead of the film piece and observed, the entire surface was almost uniform, and unevenness and defect were not recognized. From this result, it was confirmed that occurrence of the unevenness and defect observed in the evaluation described above was caused by the surface state of the liquid crystal cured layer.

[4. Method for Evaluating Orientation Quality of Liquid Crystal Cured Layer]

The liquid crystal cured layer of the multilayer film produced in each of Examples and Comparative Examples was transferred to a glass plate, to obtain a sample for measurement including the glass plate and the liquid crystal cured layer. The liquid crystal cured layer of the sample for measurement was observed by a polarized light microscope under crossed nicols. Herein, crossed nicols represents an aspect in which the polarized light transmission axes of linear polarizers (polarizer and analyzer) provided in the polarized light microscope are perpendicular as viewed in the thickness direction. During observation, the position of the liquid crystal cured layer was set to an extinction position and a position where the slow axis of the liquid crystal cured layer was shifted from the extinction position by several degrees. Herein, the extinction position represents a position where light observed becomes the weakest. The magnification of the polarized light microscope during observation was set to an objective magnification of 5 times and 50 times. The orientation quality of the liquid crystal cured layer was evaluated in accordance with the following criteria in proportion to the degree of orientation defect observed and a state of light leakage at the extinction position.

A: An orientation defect was not recognized, and light leakage at the extinction position was not almost observed.

B: A structure that seemed to be an orientation defect was slightly recognized, and light leakage at the extinction position was slightly recognized.

C: An orientation defect was clearly recognized, and light leaked at the extinction position.

[5. Method for Comprehensively Evaluating Liquid Crystal Cured Layer]

From the results of evaluation of surface state and orientation quality of the liquid crystal cured layer, the quality of the liquid crystal cured layer was comprehensively evaluated in accordance with the following criteria. In general, a liquid crystal cured layer having a poor surface state that is evaluated as "C" cannot be practically used even if it has a favorable orientation quality. On the other hand, a liquid crystal cured layer having a poor orientation quality that is evaluated as "B" has a possibility to be used if it has a favorable surface state. Therefore, the comprehensive evaluation in accordance with the following criteria was performed with the emphasis on the surface state rather than the orientation quality.

Good: The evaluation result of surface state was "A" or "B" and the evaluation result of orientation quality was "A".

Passable: The evaluation result of surface state was "A" or "B" and the evaluation result of orientation quality was "B".

Poor: The evaluation result of surface state was "C" or "D" or the evaluation result of orientation quality was "C".

[6. Method for Measuring in-Plane Retardation of Liquid Crystal Cured Layer]

The liquid crystal cured layer of the multilayer film produced in each of Examples and Comparative Examples was transferred to a glass plate, to obtain a sample for measurement including the glass plate and the liquid crystal cured layer. Using this sample for measurement, the in-plane retardation Re of the liquid crystal cured layer was measured by a polarimeter ("AxoScan" manufactured by Axometrics, Inc.) at wavelengths of 450 nm, 550 nm, and 650 nm.

Production Example 1: Production of Stretched Substrate (Production of Pre-Stretch Substrate)

Pellets of a thermoplastic norbornene resin ("ZEONOR1420R" available from ZEON Corporation) were dried at 90° C. for 5 hours. The dried pellets were supplied to an extruder, melted in the extruder, passed through a polymer pipe and a polymer filter, and extruded from a T-die on a casting drum in a form of a film. The film was cooled to produce a long-length pre-stretch substrate having a thickness of 60 μm and a width of 1,490 mm. The produced pre-stretch substrate was wound to obtain a roll.

(Stretching Treatment)

The aforementioned pre-stretch substrate was unwound from the roll and supplied to a tenter stretching machine. The pre-stretch substrate was stretched using the tenter stretching machine so that an angle of the slow axis of the stretched substrate to be obtained after stretching was 45° relative to the winding direction of stretched substrate. Both ends of the substrate in a widthwise direction of the film were trimmed, and the film was wound, to thereby obtain a roll of the long-length stretched substrate having a width of 1,350 mm. The in-plane retardation Re of the resulting stretched substrate at a measurement wavelength of 550 nm was 148 nm, and the thickness thereof was 47 μm.

Example 1: Production of Liquid Crystal Cured Layer Using Liquid Crystal Composition Containing Polymerizable Liquid Crystal Compound with Reverse Wavelength Distribution (Production of Liquid Crystal Composition)

100.0 parts of a polymerizable liquid crystal compound with reverse wavelength distribution (E1) having a structure represented by the following formula (E1), 0.30 parts of a fluorine-containing surfactant ("SURFLON S242" manufactured by AGC Seimi Chemical Co., Ltd.), 3.0 parts of a polymerization initiator ("IRGACURE379" manufactured by BASF), and 188.0 parts of cyclopentanone (manufactured by ZEON Corporation) and 282.0 parts of 1,3-dioxolane (manufactured by Toho Chemical Industry Co., Ltd.) as solvents were mixed to produce a liquid crystal composition (L1) in a liquid state.

Polymerizable Liquid Crystal Compound with Reverse Wavelength Distribution (E1)

(Formation of Liquid Crystal Cured Layer)

The stretched substrate produced in Production Example 1 was unwound from the roll and conveyed in the lengthwise direction thereof. The liquid crystal composition (L1) in the liquid state was applied onto one surface of the conveyed stretched substrate by a die coater to form a layer of the liquid crystal composition. The layer of the liquid crystal composition was subjected to an orientation treatment at 110° C. for 4 minutes, and to an irradiation treatment with ultraviolet light of 400 mJ/cm$^2$ under a N2 atmosphere for effecting curing, to form a liquid crystal cured layer. As a result, a multilayer film including the stretched substrate and the liquid crystal cured layer with a dry thickness of 2.2 μm formed on the stretched substrate was obtained. The obtained liquid crystal cured layer contained a polymer obtained by polymerizing the polymerizable liquid crystal compound with reverse wavelength distribution (E1), with homogeneous orientation regularity.

The in-plane retardation Re of the obtained liquid crystal cured layer was measured by the aforementioned method. The Re (450) at a measurement wavelength of 450 nm was 110 nm, the Re (550) at a measurement wavelength of 550 nm was 139 nm, and the Re (650) at a measurement wavelength of 650 nm was 145 nm. From the results, it was confirmed that the polymerizable liquid crystal compound with reverse wavelength distribution (E1) used in Example 1 had a property in which the birefringence Δn thereof was increased as the measurement wavelength was longer (reverse wavelength distribution). The angle of the slow axis of the liquid crystal cured layer was confirmed to be 45° relative to the winding direction, which was the same as that of the stretched substrate used in applying.

Examples 2 to 6 and Comparative Examples 1 to 5: Production of Liquid Crystal Cured Layer Using Liquid Crystal Composition Containing Polymerizable Liquid Crystal Compound with Reverse Wavelength Distribution A multilayer film including a stretched substrate and a liquid crystal cured layer was produced in the same manner as that of Example 1 except that the type of the fluorine-containing surfactant was changed to those shown in Table 2.

The liquid crystal cured layer included in the produced multilayer film contained a polymer obtained by polymerizing the polymerizable liquid crystal compound with reverse wavelength distribution (E1), with homogeneous

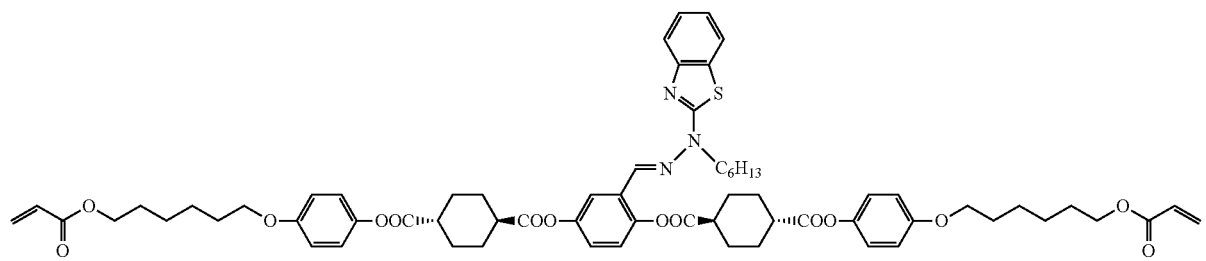

(E1)

orientation regularity. The angle of slow axis of the liquid crystal cured layer was confirmed to be 45° relative to the winding direction.

Comparative Example 6: Production of Liquid Crystal Cured Layer Using Liquid Crystal Composition Containing Polymerizable Liquid Crystal Compound with Forward Wavelength Distribution (Production of Liquid Crystal Composition)

100.0 Parts of a polymerizable liquid crystal compound with forward wavelength distribution (F1) having a structure represented by the following formula (F1) ("LC242" manufactured by BASF), 0.30 parts of a surfactant ("SURFLON S420" manufactured by AGC Seimi Chemical Co., Ltd.), 3.0 parts of a polymerization initiator ("IRGACURE379" manufactured by BASF), and 470 parts of methyl ethyl ketone (manufactured by Maruzen Petrochemical Co., Ltd.) as a solvent were mixed to produce a liquid crystal composition (L2) in a liquid state.

tive Example 6 had a property in which the birefringence Δn thereof was smaller as the measurement wavelength was longer (forward wavelength distribution). The angle of the slow axis of the liquid crystal cured layer was confirmed to be 45° relative to the winding direction, which was the same as that of the stretched substrate used in applying.

Comparative Examples 7 to 12: Production of Liquid Crystal Cured Layer Using Liquid Crystal Composition Containing Polymerizable Liquid Crystal Compound with Forward Wavelength Distribution A multilayer film including a stretched substrate and a liquid crystal cured layer was produced in the same manner as that of Comparative Example 6 except that the type and amount of the fluorine-containing surfactant were changed to those shown in Table 3.

The liquid crystal cured layer included in the produced multilayer film contained a polymer obtained by polymerizing the polymerizable liquid crystal compound with for-

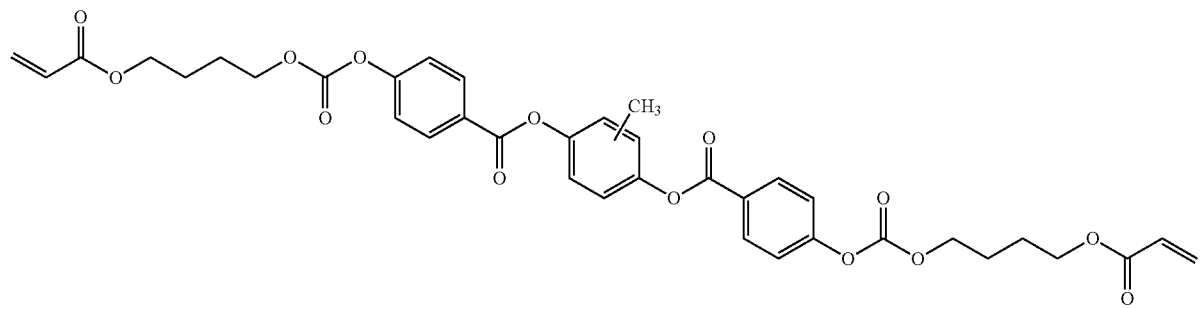

(F1)

Polymerizable Liquid Crystal Compound with Forward Wavelength Distribution (F1)

(Formation of Liquid Crystal Cured Layer)

The stretched substrate produced in Production Example 1 was unwound from the roll and conveyed in the lengthwise direction thereof. The liquid crystal composition (L2) in the liquid state was applied onto one surface of the conveyed stretched substrate by a die coater to form a layer of the liquid crystal composition. The layer of the liquid crystal composition was subjected to an orientation treatment at 100° C. for 2 minutes, and to an irradiation treatment with ultraviolet light of 400 mJ/cm$^2$ or more under a N2 atmosphere for effecting curing, to form a liquid crystal cured layer. As a result, a multilayer film including the stretched substrate and the liquid crystal cured layer with a dry thickness of 1.2 μm formed on the stretched substrate was obtained. The obtained liquid crystal cured layer contained a polymer obtained by polymerizing the polymerizable liquid crystal compound with forward wavelength distribution (F1), with homogeneous orientation regularity.

The in-plane retardation Re of the obtained liquid crystal cured layer was measured by the aforementioned method. The Re (450) at a measurement wavelength of 450 nm was 151 nm, the Re (550) at a measurement wavelength of 550 nm was 140 nm, and the Re (650) at a measurement wavelength of 650 nm was 136 nm. From the results, it was confirmed that the polymerizable liquid crystal compound with forward wavelength distribution (F1) used in Comparaward wavelength distribution (F1), with homogeneous orientation regularity. The angle of slow axis of the liquid crystal cured layer was confirmed to be 45° relative to the winding direction.

[Evaluation]

Figure 2:
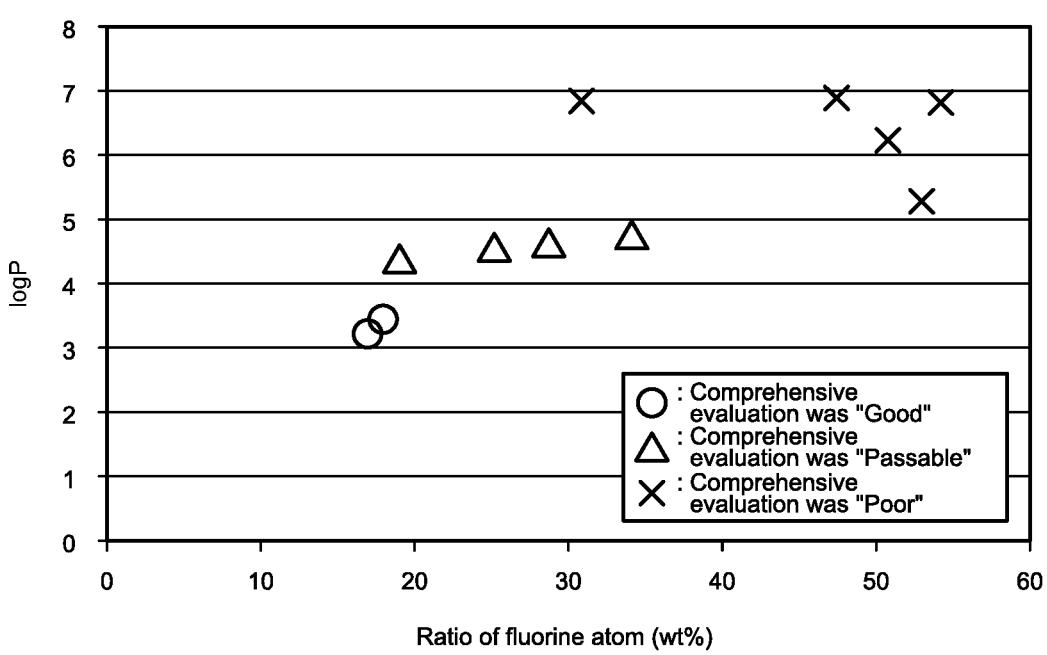
FIG. 2 is a graph showing results of Examples 1 to 6 and Comparative Examples 1 to 5 of the present invention.
Figure 3:
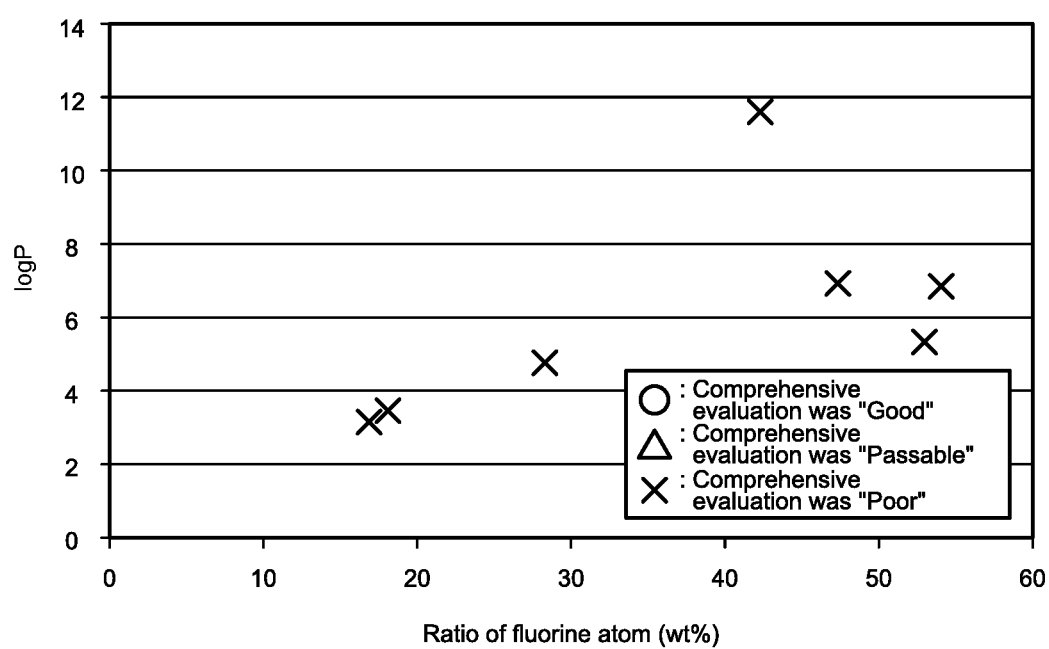
FIG. 3 is a graph showing results of Comparative Examples 6 to 12.

The surface state and orientation quality of the liquid crystal cured layers in all of the obtained multilayer films were evaluated by the aforementioned methods. The results of Examples 1 to 6 and Comparative Examples 1 to 5 are shown in Table 2 and FIG. 2, and the results of Comparative Examples 6 to 12 are shown in Table 3 and FIG. 3.

[Results]

Abbreviations in the following Tables mean as follows.

F ratio: ratio of fluorine atom in molecule of fluorine-containing surfactant log P: 1-octanol/water partition coefficient Reverse wavelength LC: polymerizable liquid crystal compound with reverse wavelength distribution represented by the above-described formula (E1)

LC242: polymerizable liquid crystal compound with forward wavelength distribution represented by the above-described formula (F1) ("LC242" manufactured by BASF)

S242: surfactant ("SURFLON S242" manufactured by AGC Seimi Chemical Co., Ltd.)

S243: surfactant ("SURFLON S243" manufactured by AGC Seimi Chemical Co., Ltd.)

S420: surfactant ("SURFLON S420" manufactured by AGC Seimi Chemical Co., Ltd.)

208G: surfactant ("FTERGENT FTX-208G" manufactured by Neos Company Limited)

209 F: surfactant ("FTERGENT FTX-209F" manufactured by Neos Company Limited)

212M: surfactant ("FTERGENT FTX-212M" manufactured by Neos Company Limited)

215M: surfactant ("FTERGENT FTX-215M" manufactured by Neos Company Limited)

218: surfactant ("FTERGENT FTX-218" manufactured by Neos Company Limited)

250: surfactant ("FTERGENT FTX-250" manufactured by Neos Company Limited)

251: surfactant ("FTERGENT FTX-251" manufactured by Neos Company Limited)

F444: surfactant ("MEGAFACE F-444" manufactured by DIC Corporation)

NS-9013: surfactant ("NS-9013" manufactured by Daikin Industries, Ltd.)

TABLE 2

Results of Examples 1-6 and Comparative Examples 1-5

| | Liquid crystal compound | Fluorine-containing surfactant | | | | Results | | |
|---|---|---|---|---|---|---|---|---|
| | | Type | F ratio | logP | Amount (parts by weight) | Surface state | Orientation | Comprehensive evaluation |
| Ex. 1 | Reverse wavelength LC | S242 | 17.9 | 3.5 | 0.3 | A | A | Good |
| Ex. 2 | Reverse wavelength LC | S243 | 16.8 | 3.2 | 0.3 | B | A | Good |
| Ex. 3 | Reverse wavelength LC | 212M | 28.6 | 4.7 | 0.3 | B | B | Passable |
| Ex. 4 | Reverse wavelength LC | 215M | 25.1 | 4.6 | 0.3 | B | B | Passable |
| Ex. 5 | Reverse wavelength LC | 250 | 18.9 | 4.4 | 0.3 | B | B | Passable |
| Ex. 6 | Reverse wavelength LC | 251 | 34.1 | 4.8 | 0.3 | B | B | Passable |
| Comp. Ex. 1 | Reverse wavelength LC | S420 | 52.9 | 5.3 | 0.3 | D | A | Poor |
| Comp. Ex. 2 | Reverse wavelength LC | 208G | 54.2 | 6.8 | 0.3 | D | A | Poor |
| Comp. Ex. 3 | Reverse wavelength LC | 218 | 47.4 | 6.9 | 0.3 | D | A | Poor |
| Comp. Ex. 4 | Reverse wavelength LC | 209F | 50.6 | 6.3 | 0.3 | D | A | Poor |
| Comp. Ex. 5 | Reverse wavelength LC | NS-9013 | 30.7 | 6.9 | 0.3 | D | A | Poor |

TABLE 3

Results of Comparative Examples 6-12

| | Liquid crystal compound | Fluorine-containing surfactant | | | | Results | | |
|---|---|---|---|---|---|---|---|---|
| | | Type | F ratio | logP | Amount (parts by weight) | Surface state | Orientation | Comprehensive evaluation |
| Comp. Ex. 6 | LC242 | S420 | 52.9 | 5.3 | 0.3 | C | A | Poor |
| Comp. Ex. 7 | LC242 | S242 | 17.9 | 3.5 | 0.5 | C | A | Poor |
| Comp. Ex. 8 | LC242 | S243 | 16.8 | 3.2 | 0.3 | C | A | Poor |
| Comp. Ex. 9 | LC242 | 208G | 54.2 | 6.8 | 0.3 | D | B | Poor |
| Comp. Ex. 10 | LC242 | 218 | 47.4 | 6.9 | 0.3 | D | C | Poor |
| Comp. Ex. 11 | LC242 | 212M | 28.6 | 4.7 | 0.3 | D | C | Poor |
| Comp. Ex. 12 | LC242 | F444 | 42.4 | 3.9 | 0.3 | D | C | Poor |

[Discussion]

As is clear from the results of Tables 2 and 3, in Examples 1 to 6 in which the fluorine-containing surfactant having a log P of less than 5 was combined with the polymerizable liquid crystal compound with reverse wavelength distribution, both the surface state and orientation quality were favorable and the comprehensive evaluation was good or passable. The liquid crystal cured layers were judged to be capable of being practically used. Further, as seen from the graph of FIG. 2, the fluorine-containing surfactant having a log P of less than 4 was particularly excellent. In contrast, in Comparative Examples 6 to 12 in which the polymerizable liquid crystal compound with forward wavelength distribution was used, a region wherein both the surface state and orientation quality were excellent was not found.

The invention claimed is:

1. A liquid crystal composition comprising a polymerizable liquid crystal compound capable of expressing birefringence with reverse wavelength distribution and a surfactant containing a fluorine atom,
    a 1-octanol/water partition coefficient of the surfactant being less than 5.0.

2. The liquid crystal composition according to claim 1, wherein a ratio of the fluorine atom in a molecule of the surfactant is 30% by weight or less.

3. The liquid crystal composition according to claim 1, wherein the polymerizable liquid crystal compound contains a main chain mesogen and a side chain mesogen bonded to the main chain mesogen in a molecule of the polymerizable liquid crystal compound.

4. The liquid crystal composition according to claim 1, wherein the polymerizable liquid crystal compound is represented by the following formula (I):

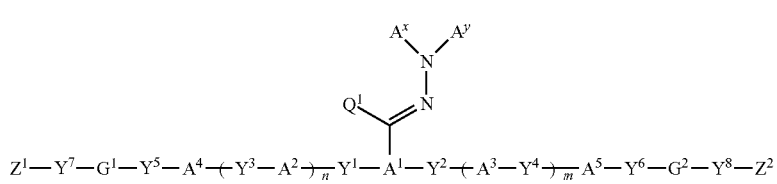

(in the formula (I),

Y$^1$ to Y$^8$ each independently represent a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ represents a hydrogen atom or an alkyl group of 1 to 6 carbon atoms;

G$^1$ and G$^2$ each independently represent a divalent aliphatic group of 1 to 20 carbon atoms optionally having a substituent, wherein the aliphatic group may contain one or more per aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein, with a proviso that cases where two or more —O— or —S— groups are adjacent to each other are excluded, and wherein R$^2$ represents a hydrogen atom or an alkyl group of 1 to 6 carbon atoms;

Z$^1$ and Z$^2$ each independently represent an alkenyl group of 2 to 10 carbon atoms optionally substituted with a halogen atom;

A$^x$ represents an organic group of 2 to 30 carbon atoms having at least one aromatic ring selected from the group consisting of an aromatic hydrocarbon ring and an aromatic heterocyclic ring;

A$^y$ represents a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms containing at least one aromatic ring selected from the group consisting of an aromatic hydrocarbon ring and an aromatic heterocyclic ring, wherein R$^3$ represents an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; R$^4$ represents an alkyl group of 1 to 20 carbon atoms, an alkenyl group of 2 to 20 carbon atoms, a phenyl group, or a 4-methylphenyl group; R$^9$ represents an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring contained in A$^x$ and A$^y$ may have a substituent; and A$^x$ and A$^y$ may form a ring together;

A$^1$ represents a trivalent aromatic group optionally having a substituent;

A$^2$ and A$^3$ each independently represent a divalent alicyclic hydrocarbon group of 3 to 30 carbon atoms optionally having a substituent;

A$^4$ and A$^5$ each independently represent a divalent aromatic group of 6 to 30 carbon atoms optionally having a substituent;

Q$^1$ represents a hydrogen atom or an alkyl group of 1 to 6 carbon atoms optionally having a substituent; and m and n each independently represent 0 or 1).

5. A liquid crystal cured layer comprising a cured product of the liquid crystal composition according to claim 1.

6. The liquid crystal cured layer according to claim 5, wherein the liquid crystal cured layer has a long-length shape;

the liquid crystal cured layer has a slow axis at an angle of 40° to 50° relative to a lengthwise direction of the liquid crystal cured layer.

7. A method for producing a liquid crystal cured layer, comprising the steps of:

applying the liquid crystal composition according to claim 1 onto a supporting surface to form a layer of the liquid crystal composition;

giving orientation to the polymerizable liquid crystal compound contained in the layer of the liquid crystal composition; and curing the layer of the liquid crystal composition.

* * * * *